(12) United States Patent
Choi

(10) Patent No.: US 11,987,106 B2
(45) Date of Patent: May 21, 2024

(54) VEHICLE DOOR CHECK MECHANISM AND VEHICLE DOOR OPENING AND CLOSING APPARATUS HAVING THE SAME

(71) Applicants: Hyundai Motor Company, Seoul (KR); Kia Motors Corporation, Seoul (KR)

(72) Inventor: Je Won Choi, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 852 days.

(21) Appl. No.: 17/009,138

(22) Filed: Sep. 1, 2020

(65) Prior Publication Data

US 2021/0170842 A1 Jun. 10, 2021

(30) Foreign Application Priority Data

Dec. 5, 2019 (KR) .......................... 10-2019-0160950

(51) Int. Cl.
*B60J 5/06* (2006.01)
*E05C 17/20* (2006.01)
*E05D 15/10* (2006.01)
*E05D 15/48* (2006.01)

(52) U.S. Cl.
CPC .............. *B60J 5/06* (2013.01); *E05C 17/203* (2013.01); *E05D 15/1081* (2013.01); *E05D 2015/485* (2013.01); *E05Y 2900/532* (2013.01)

(58) Field of Classification Search
CPC .. B60J 5/06; B60J 5/0468; B60J 5/047; E05C 17/203; E05C 17/02; E05C 17/60; E05C 17/206; E05D 15/1081; E05D 2015/485; E05D 11/1057; E05D 2015/1049; E05D 2015/1055; E05D 15/1047; E05D 15/58; E05Y 2900/532; E05Y 2900/531; E05Y 2201/684; E05Y 2201/692
USPC ..................................................... 296/146.12
See application file for complete search history.

(56) References Cited

U.S. PATENT DOCUMENTS 2,268,942 A * 1/1941 Jacobs .................. E05C 17/206
16/85
2,268,977 A * 1/1942 Westrope .............. E05C 17/206
16/86 A
2,291,412 A * 7/1942 Schonitzer ............ E05C 17/206
16/86 A (Continued)

FOREIGN PATENT DOCUMENTS

CN 107035250 A 8/2017
KR 20020076767 A 10/2002

(Continued)

*Primary Examiner* — Pinel E Romain
(74) *Attorney, Agent, or Firm* — Slater Matsil, LLP

(57) ABSTRACT

A vehicle door check mechanism includes a strap body mounted on a portion of a vehicle door adjacent to a rotation axis of the vehicle door, and configured to move with the vehicle door as the vehicle door swings around the rotation axis, and a hold unit configured to allow the strap body to be held at regular intervals, wherein the strap body is curved to have a predetermined curvature radius. A center of the curvature radius is located on the rotation axis of the vehicle door, and the strap body has a fixed end which is fixed to the vehicle door, and a free end which is spaced apart from the vehicle door.

19 Claims, 35 Drawing Sheets

(56) References Cited

U.S. PATENT DOCUMENTS

| | | | | |
|---|---|---|---|---|
| 2,980,945 A * | 4/1961 | Hollar, Jr. | ............. | E05C 17/203 |
| | | | | 16/85 |
| 5,074,010 A * | 12/1991 | Gignac | ................ | E05C 17/206 |
| | | | | 16/334 |
| 6,349,448 B1 | 2/2002 | Breed et al. | | |
| 7,438,346 B1 * | 10/2008 | Breed | ................... | E05C 17/203 |
| | | | | 296/146.12 |
| 8,567,126 B2 * | 10/2013 | Hozumi | .................... | B60J 5/06 |
| | | | | 49/143 |
| 9,605,466 B2 * | 3/2017 | Wojdyla | ................... | E05B 81/70 |
| 10,801,245 B2 * | 10/2020 | Cumbo | ................... | F16H 55/26 |
| 2016/0114659 A1 | 4/2016 | Maruyama et al. | | |
| 2016/0123060 A1 | 5/2016 | Choi et al. | | |
| 2021/0140215 A1 | 5/2021 | Choi | | |

FOREIGN PATENT DOCUMENTS

| | | | |
|---|---|---|---|
| KR | 20030097214 A | | 12/2003 |
| KR | 20060041531 A | | 5/2006 |
| KR | 20100049835 A | | 5/2010 |
| KR | 20130042408 A | | 4/2013 |
| KR | 20130068210 A | | 6/2013 |
| KR | 20140072575 A | | 6/2014 |
| KR | 20160051361 A | | 5/2016 |
| KR | 20160053098 A | | 5/2016 |
| KR | 20210057616 A | | 5/2021 |

* cited by examiner

VEHICLE DOOR CHECK MECHANISM AND VEHICLE DOOR OPENING AND CLOSING APPARATUS HAVING THE SAME

CROSS-REFERENCE TO RELATED APPLICATION

This application claims the benefit of Korean Patent Application No. 10-2019-0160950, filed on Dec. 5, 2019, in the Korean Intellectual Property Office, which application is hereby incorporated herein by reference.

TECHNICAL FIELD

The present disclosure relates to a vehicle door check mechanism and a vehicle door opening and closing apparatus having the same.

BACKGROUND

Vehicles have door apertures for ingress and egress of vehicle passengers to and from a passenger compartment. A vehicle door is closed to block the door aperture and is opened to enable ingress and egress of passengers to and from the passenger compartment through the door aperture.

Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively more force and time to open and close, which hinders quick ingress and egress of passengers.

According to the related art, as a vehicle door is operated by a single opening and closing method, it may be difficult to adequately respond to the needs of customers seeking ease of use, diversity, and novelty.

Meanwhile, the swing door includes a vehicle door check mechanism such as a check strap allowing the swing door to be held and stopped at predetermined intervals when the swing door is opened. The vehicle door check mechanism may be disposed between the vehicle door and the vehicle body. However, as the vehicle door check mechanism according to the related art has a straight structure, it may be difficult to install the vehicle door check mechanism when a space between the swing door and the vehicle body is narrow as in a pillarless vehicle. In addition, it may be difficult to reliably ensure a check operation of the vehicle door check mechanism.

The above information described in this background section is provided to assist in understanding the background of the inventive concept, and may include any technical concept which is not considered as the prior art that is already known to those skilled in the art.

SUMMARY

Embodiments of the present disclosure solves problems occurring in the prior art while advantages achieved by the prior art are maintained intact.

The present disclosure relates to a vehicle door check mechanism and a vehicle door opening and closing apparatus having the same. Particular embodiments relate to a vehicle door check mechanism that can be applied to vehicles of various structures and a vehicle door opening and closing apparatus having the same.

An embodiment of the present disclosure provides a vehicle door check mechanism having a curved structure corresponding to a swing trajectory of a vehicle door, thereby being applied to vehicles of various structures, and a vehicle door opening and closing apparatus having the same.

According to an embodiment of the present disclosure, a vehicle door check mechanism may include a strap body mounted on a portion of a vehicle door adjacent to a rotation axis of the vehicle door, and configured to move with the vehicle door as the vehicle door swings around the rotation axis, and a hold unit configured to allow the strap body to be held at regular intervals, wherein the strap body may be curved to have a predetermined curvature radius.

A center of the curvature radius may be located on the rotation axis of the vehicle door, and the strap body may have a fixed end which is fixed to the vehicle door, and a free end which is spaced apart from the vehicle door.

The hold unit may include a first hold member and a second hold member disposed on both sides of the strap body. The first hold member may have a plurality of recesses spaced apart from each other in a longitudinal direction of the first hold member, and the second hold member may have a plurality of recesses spaced apart from each other in a longitudinal direction of the second hold member. The strap body may have a first projection selectively received in any one of the recesses of the first hold member, and a second projection selectively received in any one of the recesses of the second hold member.

The first hold member may have a first cushion material contacting the first projection, and the second hold member may have a second cushion material contacting the second projection.

The hold unit may include a hold member located below the strap body. The strap body may have a roller rotatably mounted on the free end. The hold member may have a plurality of recesses, the recesses may be spaced apart from each other in a longitudinal direction of the hold member, and the roller may be selectively received in any one of the recesses.

The strap body may have a plurality of recesses facing the rotation axis of the vehicle door, and the hold unit may include a cam member having a projection selectively received in any one of the recesses of the strap body.

The cam member may allow the projection to be biased toward the recesses by a biasing element.

The hold unit may further include a guide roller guiding a movement of the strap body. The guide roller may be disposed to face the cam member.

The vehicle door check mechanism may further include a guide member guiding a movement of the strap body.

The strap body may have a plurality of inner peripheral recesses facing the rotation axis of the vehicle door, and a plurality of outer peripheral recesses opposing the plurality of inner peripheral recesses. The hold unit may include a first ball selectively received in any one of the outer peripheral recesses, and a second ball selectively received in any one of the inner peripheral recesses.

The vehicle door check mechanism may further include a strap housing guiding a movement of the strap body, and the first ball and the second ball may be mounted in the strap housing.

The first ball may be supported by a first ball support, and the first ball support may be elastically supported by a first elastic member. The second ball may be supported by a second ball support, and the second ball support may be elastically supported by a second elastic member.

According to another embodiment of the present disclosure, a vehicle door opening and closing apparatus may include a vehicle door, a rail mounted on a vehicle body, a roller unit mounted on the vehicle door, and allowing the vehicle door to open and close in one mode selected from a sliding mode, in which the vehicle door slides along the rail, and a swing mode, in which the vehicle door swings in a predetermined position of the rail, and a vehicle door check mechanism disposed between the vehicle door and the roller unit. The vehicle door check mechanism may include a strap body mounted on a portion of a vehicle door adjacent to a rotation axis of the vehicle door, and moving with the vehicle door as the vehicle door swings around the rotation axis, and a hold unit allowing the strap body to be held at regular intervals. The strap body may be curved to have a predetermined curvature radius.

The roller unit may include a hold lock, and the roller unit may be releasably held in the predetermined position of the rail by the hold lock. The vehicle door may swing around the rotation axis when the roller unit is held in the predetermined position of the rail by the hold lock, and the vehicle door may slide along the rail when the roller unit is released by the hold lock.

The roller unit may include a roller bracket having a roller rolling along the rail, and a body connecting the roller bracket and the vehicle door, and the hold unit may be mounted on the body.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
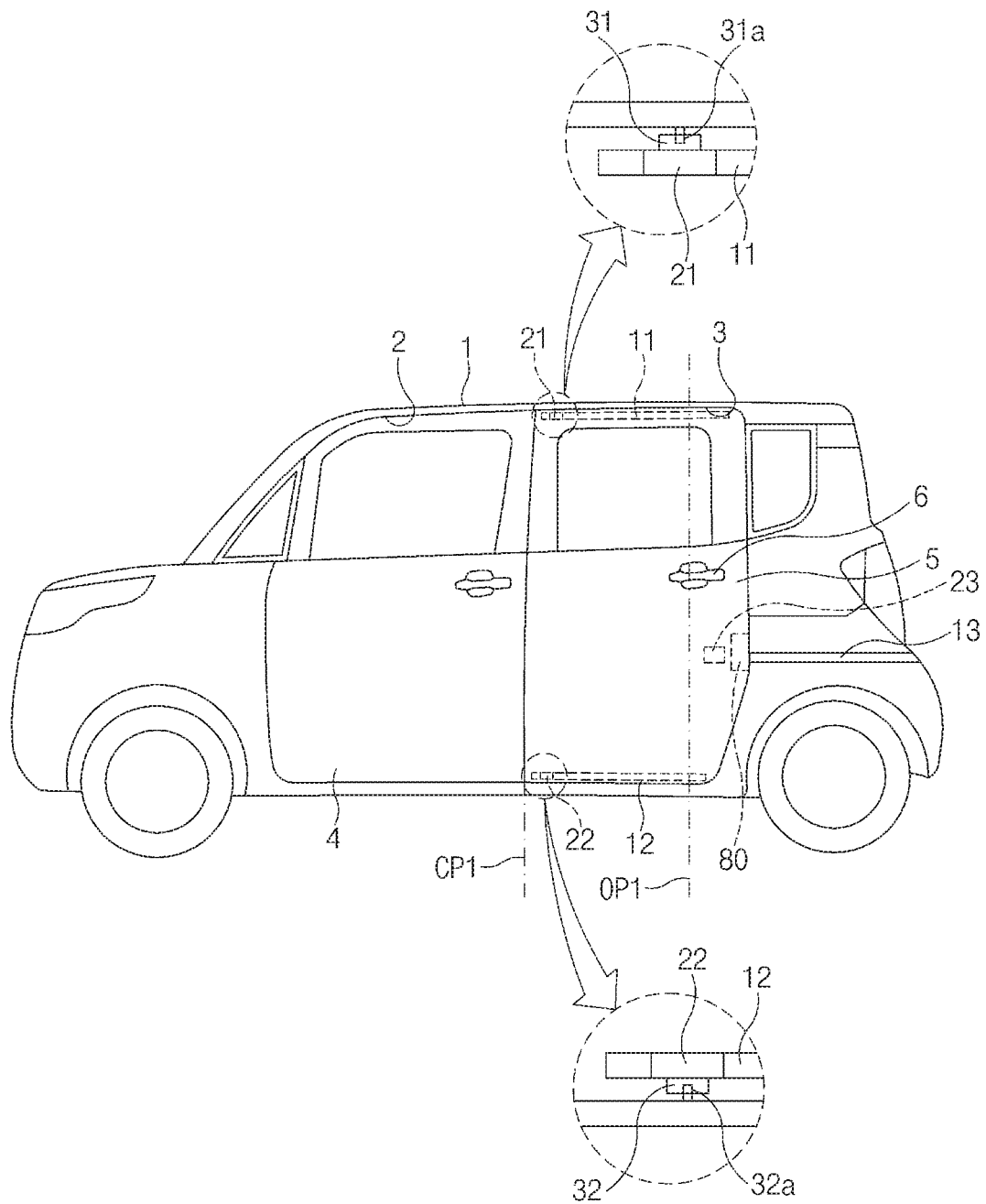
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 16 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

Figure 3:
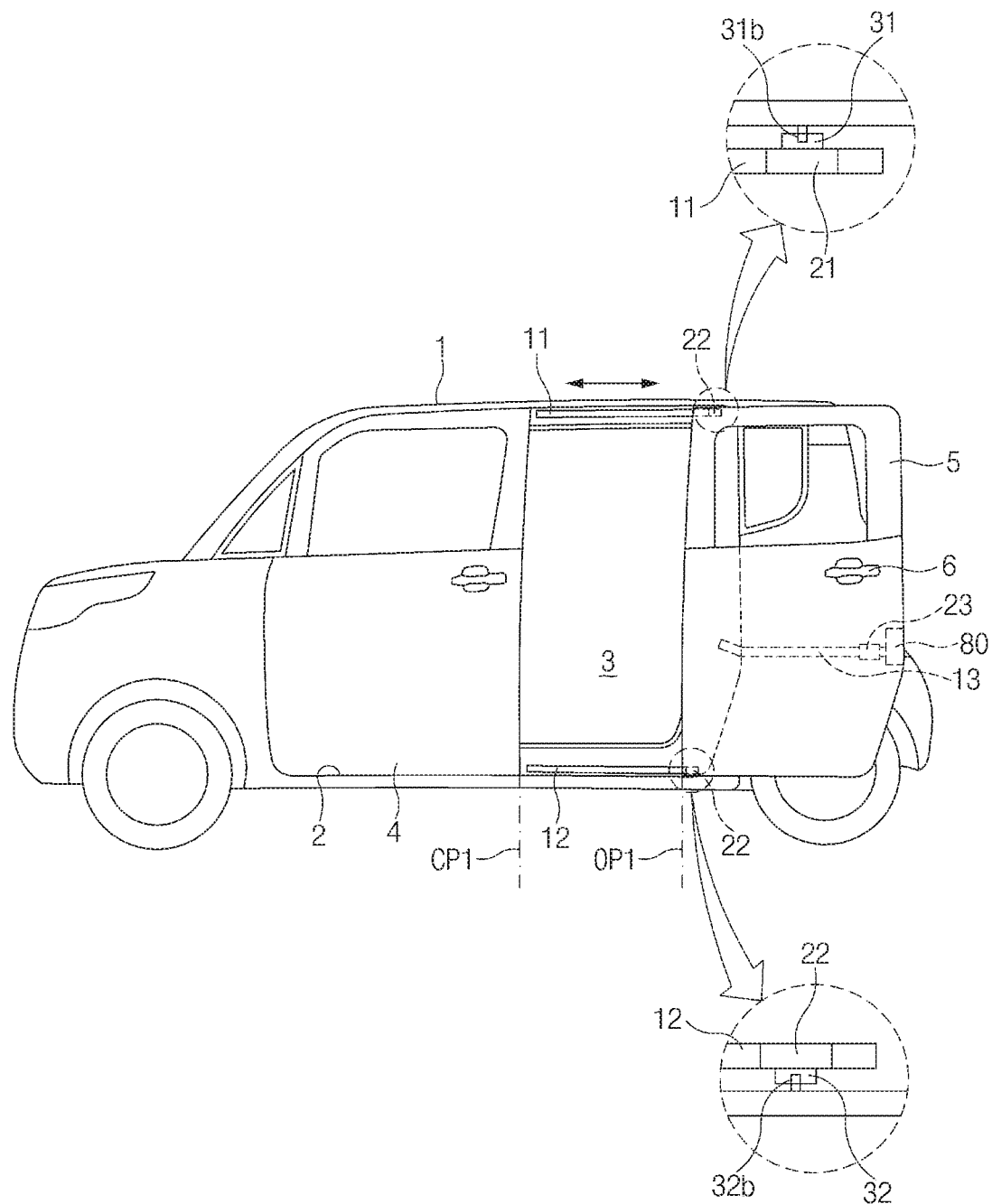
FIG. 3 illustrates a state in which the door of FIG. 1 is opened in a sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
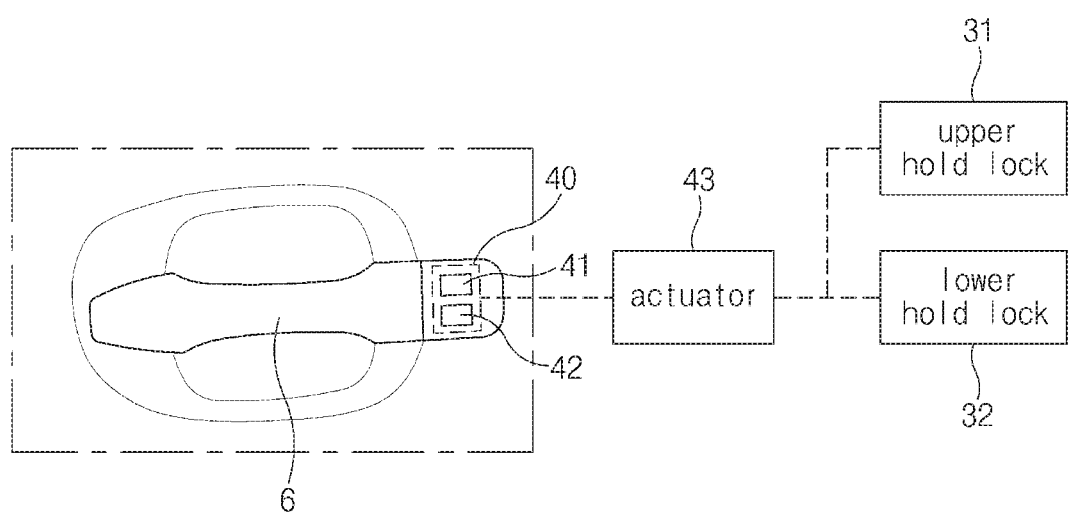
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode and the swing mode may be adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
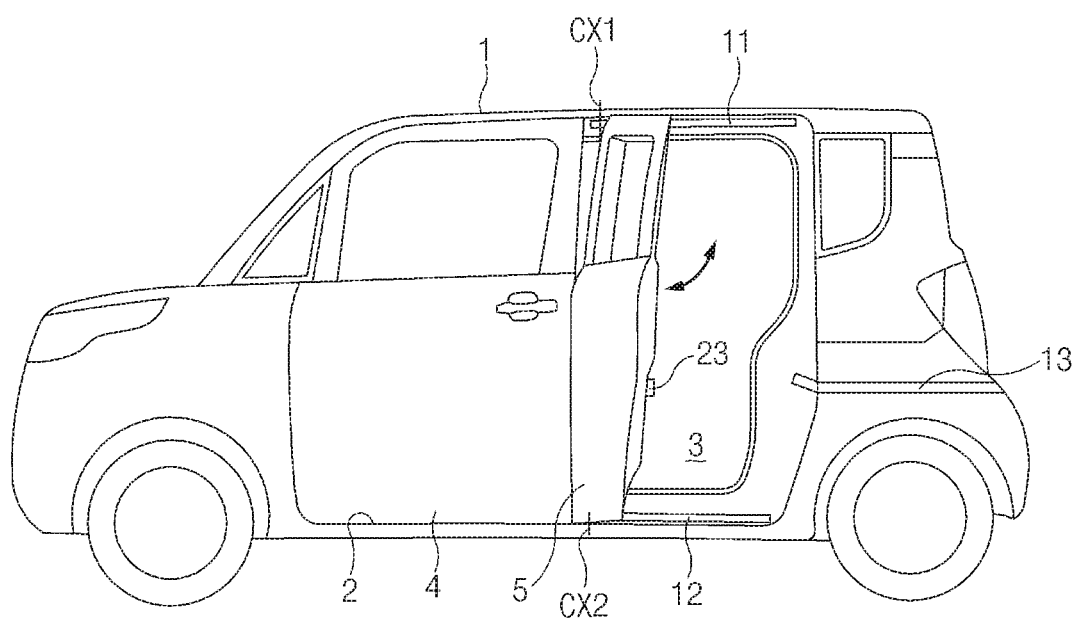
FIG. 4 illustrates a state in which the door of FIG. 1 is opened in a swing mode.
Figure 7:
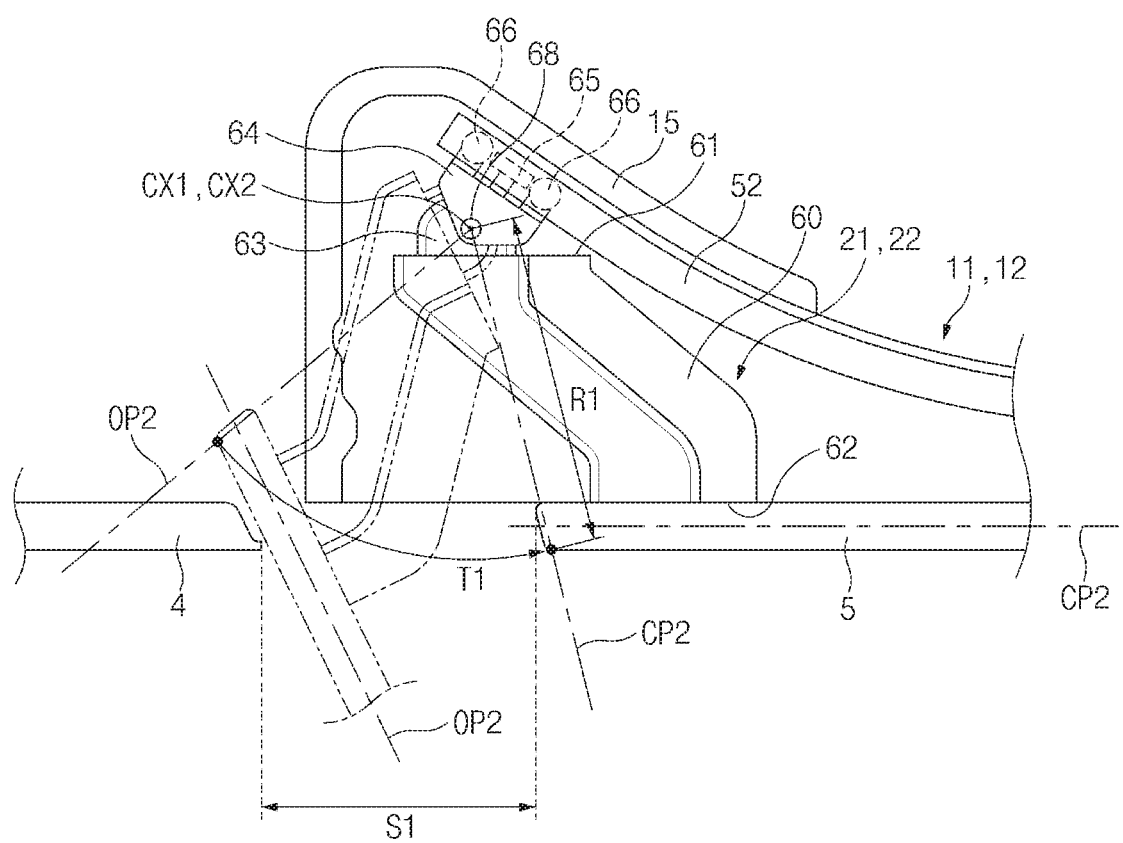
FIG. 7 illustrates an operation in which a vehicle door is opened and closed in a swing mode by an upper roller unit and a lower roller unit of a vehicle door opening and closing apparatus according to an exemplary embodiment of the present disclosure.
Figure 9:
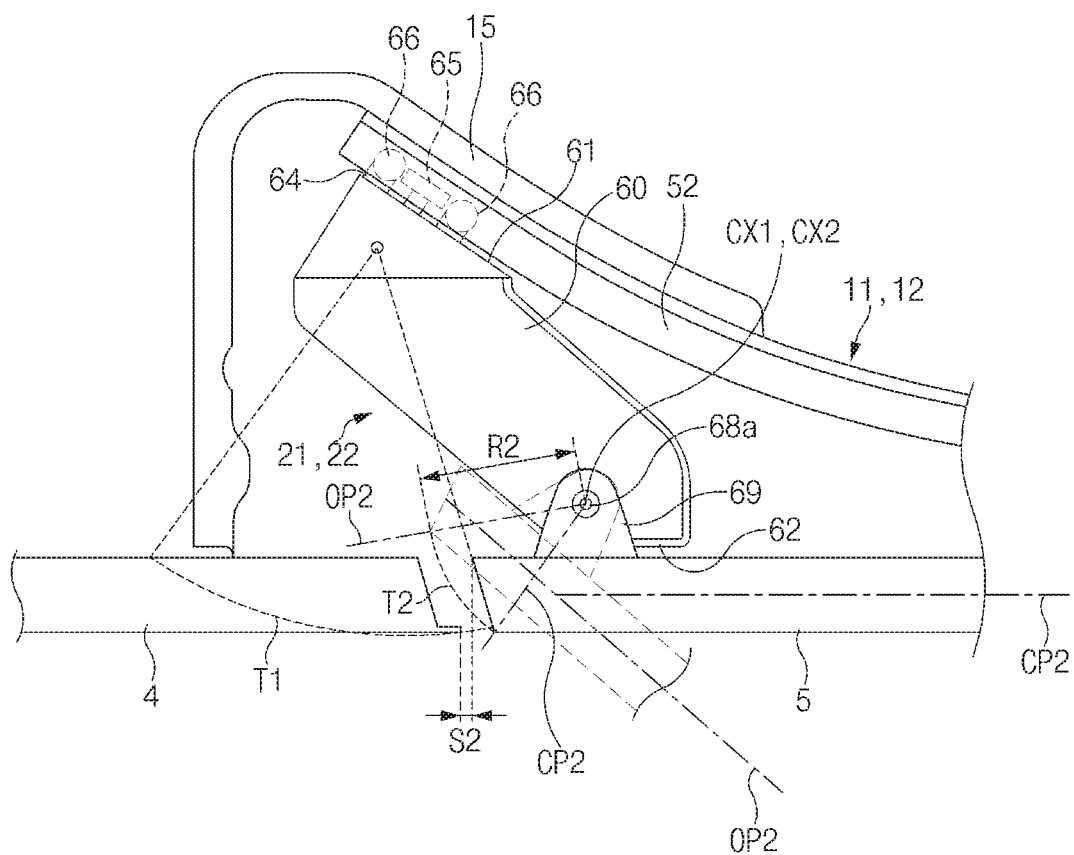
FIG. 9 illustrates an operation in which a vehicle door is opened and closed in a swing mode by an upper roller unit and a lower roller unit of a vehicle door opening and closing apparatus according to another exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIGS. 7 and 9. In particular, when the vehicle door 5 is held in the first closed position CP1, it may be operated in the swing mode.

The upper roller unit 21 may have an upper hold lock 31, and the vehicle body 1 may have a first upper striker 31a and a second upper striker 31b protruding downwardly from a roof of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1, so that the vehicle door 5 may be kept in the first closed position CP1. As the upper hold lock 31 holds the second upper striker 31b, the upper roller unit 21 may be firmly held in the first open position OP1, so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and may releasably hold the second upper striker 31b in the first open position OP1. That is, the upper closed hold lock, which releasably holds the first upper striker 31a in the first closed position CP1, and the upper open hold lock, which releasably holds the second upper striker 31b in the first open position OP1, may be individually mounted on the upper roller unit 21.

Referring to FIGS. 4 and 9, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from the bottom of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1, so that the vehicle door 5 may be kept in the first closed position CP1. As the lower hold lock 32 holds the second lower striker 32b, the lower roller unit 22 may be firmly held in the first open position OP1, so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and may releasably hold the second lower striker 32b in the first open position OP1. That is, the lower closed hold lock, which releasably holds the first lower striker 32a in the first closed position CP1, and the lower open hold lock, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32, so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIGS. 4 and 9, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 40 in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an actuator operating the upper hold lock 31 and another actuator operating the lower hold lock 32 may be individually connected to the selector 40.

FIGS. 10A to 10D illustrate the upper hold lock 31 and the lower hold lock 32 according to an exemplary embodiment of the present disclosure. Referring to FIGS. 10A to 10D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 10A to 10D, the upper hold lock 31 may releasably hold the first upper striker 31a, and the lower hold lock 32 may releasably hold the first lower striker 32a.

Figure 10A:
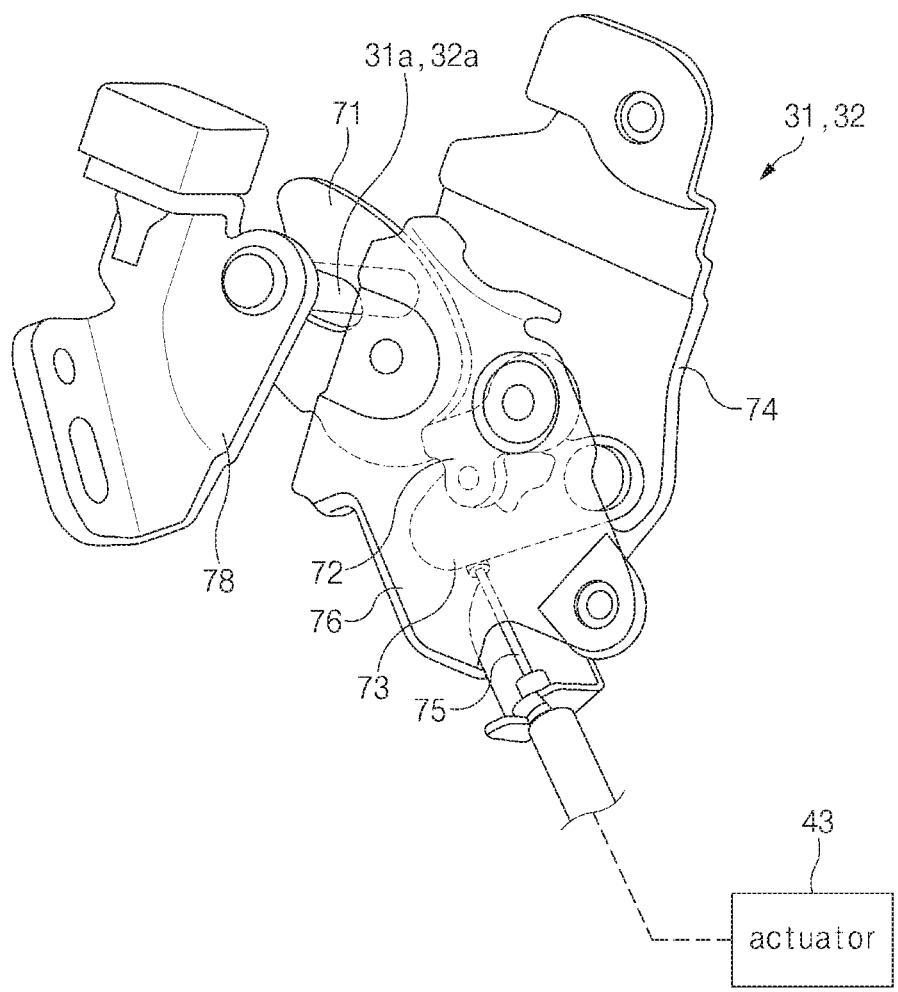
FIG. 10A illustrates a perspective view of an upper hold lock and a lower hold lock.
Figure 10B:
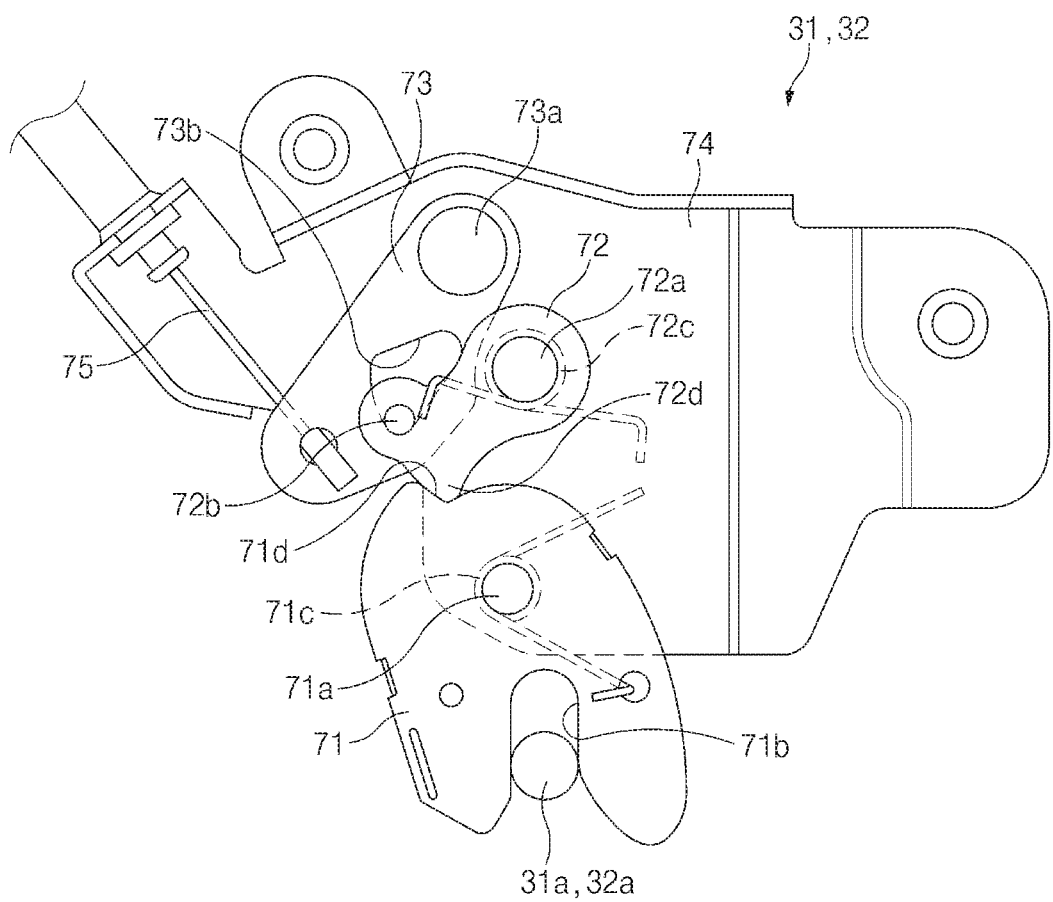
FIG. 10B illustrates a state in which an upper hold lock and a lower hold lock hold corresponding strikers.
Figure 10C:
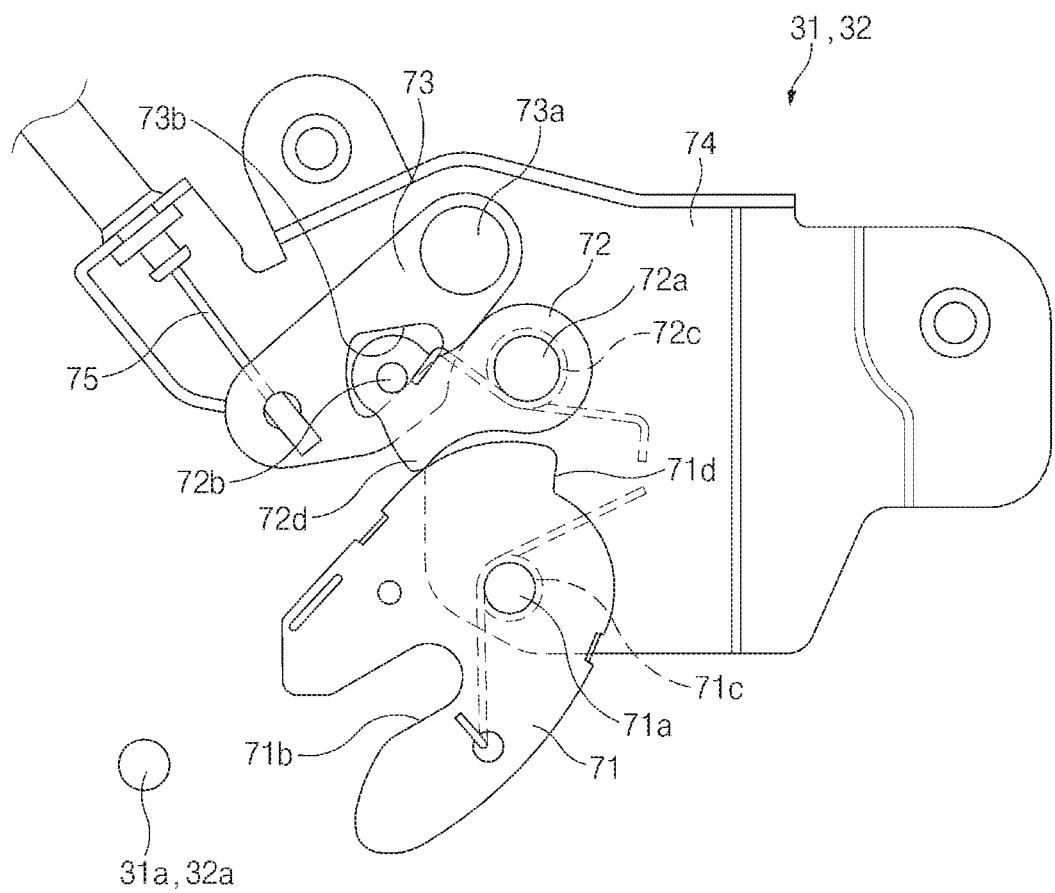
FIG. 10C illustrates a state in which an upper hold lock and a lower hold lock release corresponding strikers.

The catch 71 may be pivotally mounted on the mounting plate 74 through a first pivot shaft 71a. The catch 71 may have a slot 71b receiving the strikers 31a and 32a, and the catch 71 may engage and release the strikers 31a and 32a. The catch 71 may move between an engaging position (see FIG. 10B) and a release position (see FIG. 10C). The engaging position refers to a position in which the catch 71 engages with the strikers 31a and 32a as illustrated in FIG. 10B, and the release position refers to a position in which the catch 71 releases the strikers 31a and 32a as illustrated in FIG. 10C. When the catch 71 is in the engaging position as illustrated in FIG. 10B, the catch 71 may engage with the strikers 31a and 32a so that the catch 71 may hold the strikers 31a and 32a. When the catch 71 is in the release position as illustrated in FIG. 10C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft 71a. The catch 71 may have a locking shoulder 71d.

Figure 10D:
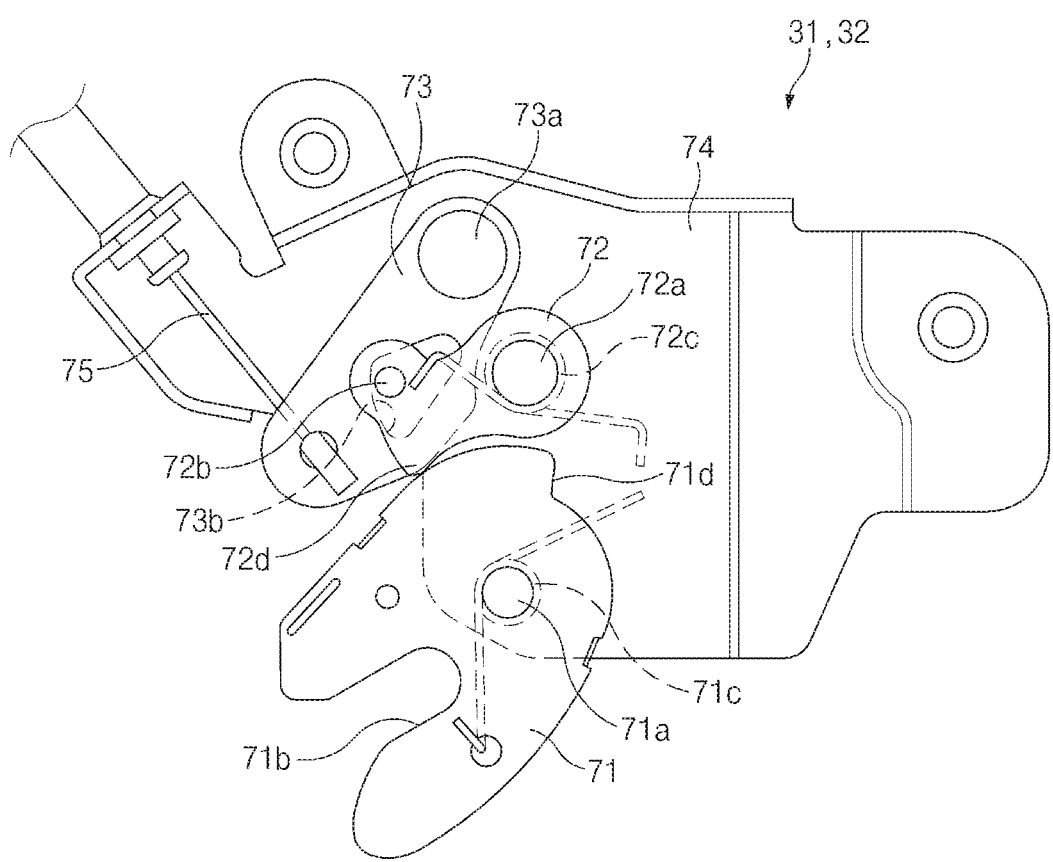
FIG. 10D illustrates a state in which an upper hold lock and a lower hold lock are enabled to receive corresponding strikers.

The pawl 72 may be pivotally mounted on the mounting plate 74 through a second pivot shaft 72a, and the pawl 72 may move between a pawl locking position (see FIG. 10B) and a pawl release position (see FIGS. 10C and 10D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 10B, when the pawl 72 is in the pawl locking position, the movement (rotation) of the catch 71 may be restricted by the pawl 72 so that the catch 71 may be kept in the engaging position. As illustrated in FIGS. 10C and 10D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 10B) by a second biasing element 72c such as a torsion spring. The second biasing element 72c may be disposed around the second pivot shaft 72a.

The pawl 72 may have a locking projection 72d locked to the locking shoulder 71d of the catch 71. As illustrated in FIG. 10B, as the pawl 72 is moved to the pawl locking position by the second biasing element 72c, the locking projection 72d of the pawl 72 may be locked to the locking shoulder 71d of the catch 71 and the movement (rotation) of the catch 71 may be restricted, so that the catch 71 may be kept in the engaging position. As illustrated in FIG. 10C, as the pawl 72 is moved to the pawl release position by the lever 73, the locking projection 72d of the pawl 72 may be released from the locking shoulder 71d of the catch 71 and the movement (rotation) of the catch 71 may be allowed, so that the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a. The lever 73 may move the pawl 72 to the pawl release position (see FIG. 10C) by reversing the cable 75.

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 10B, when the cable 75 is advanced by the actuator 43, the locking projection 72d of the pawl 72 may be locked to the locking shoulder 71d of the catch 71 and the movement (rotation) of the catch 71 may be restricted so that the catch 71 may be kept in the engaging position. The strikers 31a and 32a may be held in the slot 71b of the catch 71. That is, the upper hold lock 31 and the lower hold lock 32 may hold the corresponding strikers 31a and 32a.

As illustrated in FIG. 10C, when the cable 75 is reversed by the actuator 43, the lever 73 may move the pawl 72 to the pawl release position. The locking projection 72d of the pawl 72 may be released from the locking shoulder 71d of the catch 71 and the movement (rotation) of the catch 71 may be allowed, so that the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 10D, even though the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowed. In this state, the strikers 31a and 32a may be allowed to be received in the slot 71b of the catch 71. That is, in a state in which the movement (rotation) of the catch 71 is allowed as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When a force applied by the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 10B, as the locking projection 72d of the pawl 72 is locked to the locking shoulder 71d of the catch 71, the catch 71 may hold the strikers 31a and 32a.

Figure 5:
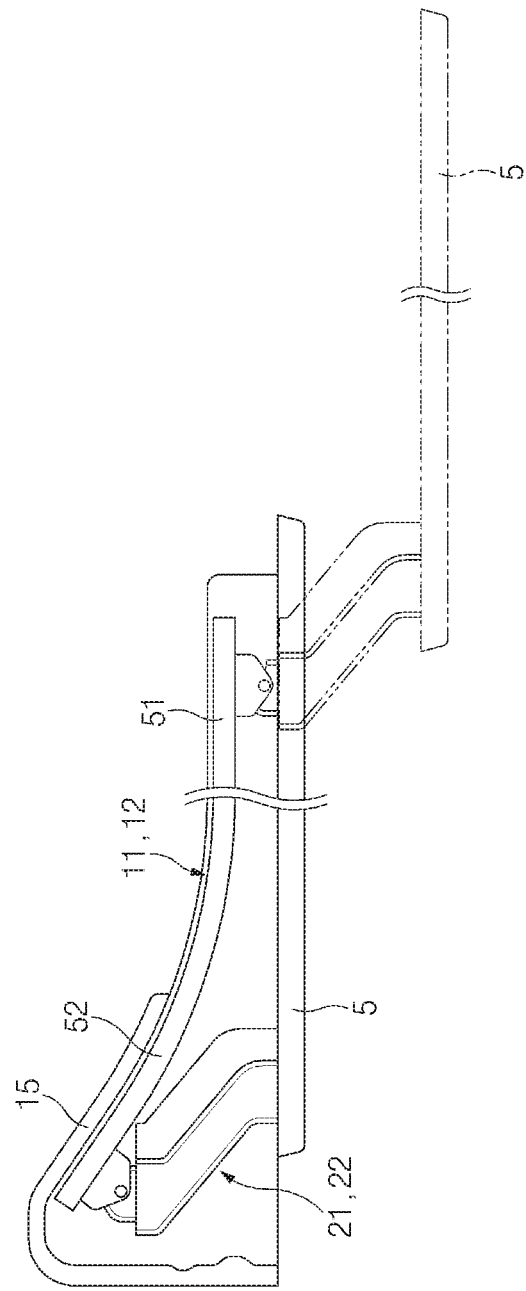
FIG. 5 illustrates an operation in which an upper roller unit and a lower roller unit move along an upper rail and a lower rail in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 6:
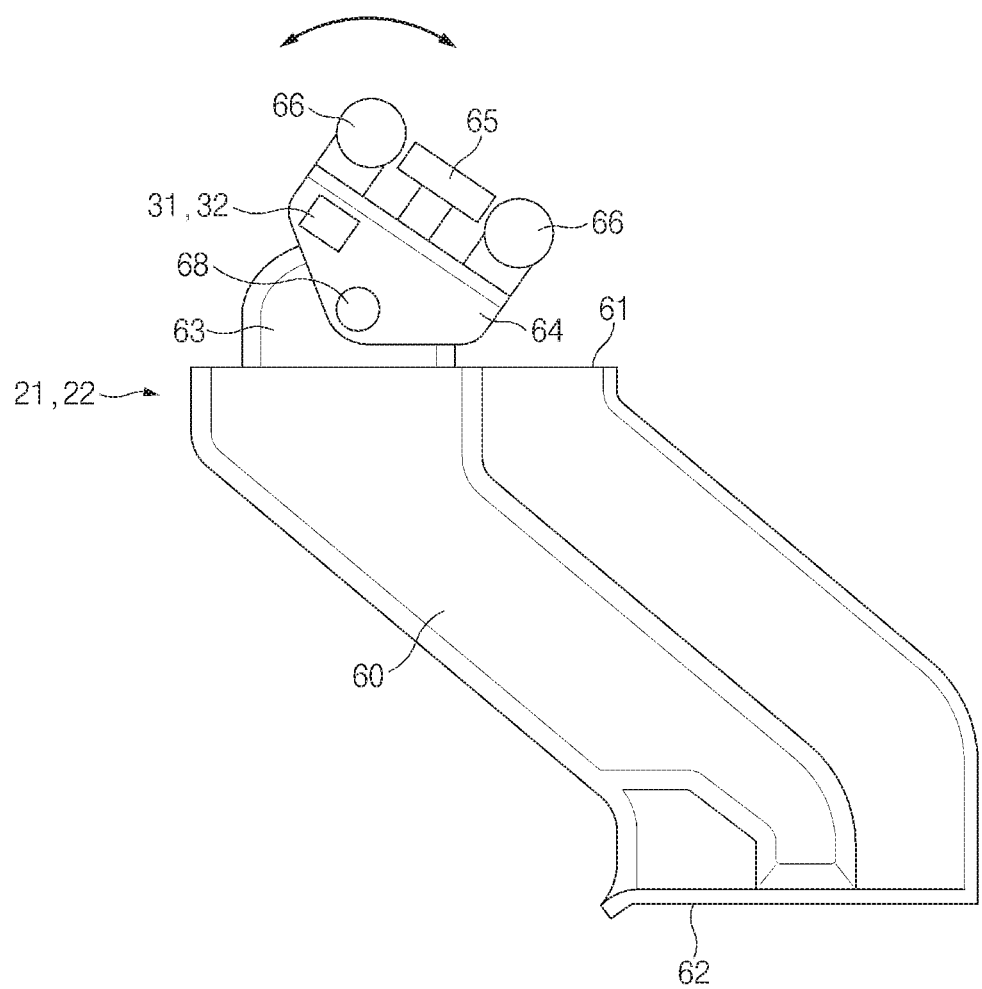
FIG. 6 illustrates an upper roller unit and a lower roller unit in a vehicle door opening and closing apparatus according to an exemplary embodiment of the present disclosure.

Referring to FIG. 6, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The body 60 may extend diagonally so as not to contact the first extension portion 51 and the second extension portion 52. The body 60 may have a first end portion 61 facing the interior side of the vehicle, and a second end portion 62 facing the exterior side of the vehicle. The first end portion 61 of the body 60 may be attached to the roller bracket 64, and the second end portion 62 of the body 60 may be attached to the vehicle door 5.

The roller bracket 64 may rotatably support the rollers 65 and 66, and the rollers 65 and 66 may roll along the upper rail 11 and the lower rail 12. As illustrated in FIG. 6, a middle roller 65 and two side rollers 66 disposed on both sides of the middle roller 65 may be rotatably mounted on the roller bracket 64. A rotation axis of the middle roller 65 may be orthogonal to a rotation axis of the side roller 66.

According to an exemplary embodiment, as illustrated in FIG. 6, the first end portion 61 of the body 60 may be pivotally connected to the roller bracket 64 through a pivot pin 68, and the second end portion 62 of the body 60 may be fixed to the vehicle door 5. Thus, the vehicle door 5 may swing around the pivot pin 68 adjacent to the roller bracket 64. The body 60 may have a pivot lug 63 protruding from the first end portion 61 toward the roller bracket 64, and the roller bracket 64 may be connected to the pivot lug 63 through the pivot pin 68. The roller bracket 64 may be shaped so as not to interfere with the body 60 when the vehicle door 5 swings. The upper rotation axis CX1 and the lower rotation axis CX2 may be defined by the pivot pin 68. For example, the upper rotation axis CX1 and the lower rotation axis CX2 may be a virtual axis extending vertically along a center point of the pivot pin 68, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the roller bracket 64 of the upper roller unit 21, and the lower hold lock 32 may be fixed to the roller bracket 64 of the lower roller unit 22.

When, by the hold operation of the actuator 43, the upper hold lock 31 firmly holds the roller bracket 64 of the upper roller unit 21 in the first closed position CP1 and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22 as illustrated in FIG. 7. The vehicle door 5 may move between the second closed position CP2 in which the vehicle door 5 is closed and the second open position OP2 in which the vehicle door 5 is opened. When the vehicle door 5 swings, another adjacent door 4 or other components may be spaced apart from the vehicle door 5 by a predetermined gap S1 so as not to interfere with the door 4 or the other components. For example, the vehicle door 5 may be a rear door, and another adjacent door 4 may be a front door.

According to the exemplary embodiment illustrated in FIGS. 6 and 7, as the pivot pin 68 is located between the roller bracket 64 and the first end portion 61 of the body 60, the rotation axes CX1 and CX2 of the vehicle door 5 may be relatively far from the vehicle door 5. Since a swing trajectory T1 and a rotation radius R1 of the vehicle door 5 are relatively increased, the gap S1 between the vehicle door 5 and the adjacent door 4 may be relatively increased. If the gap S1 between the vehicle door 5 and the adjacent door 4 is reduced, the vehicle door 5 may interfere with the adjacent door 4 when the vehicle door 5 moves toward the second open position OP2, and an open space created by the swing of the vehicle door 5 may be relatively narrowed since the swing trajectory T1 of the vehicle door 5 is relatively reduced.

Figure 8:
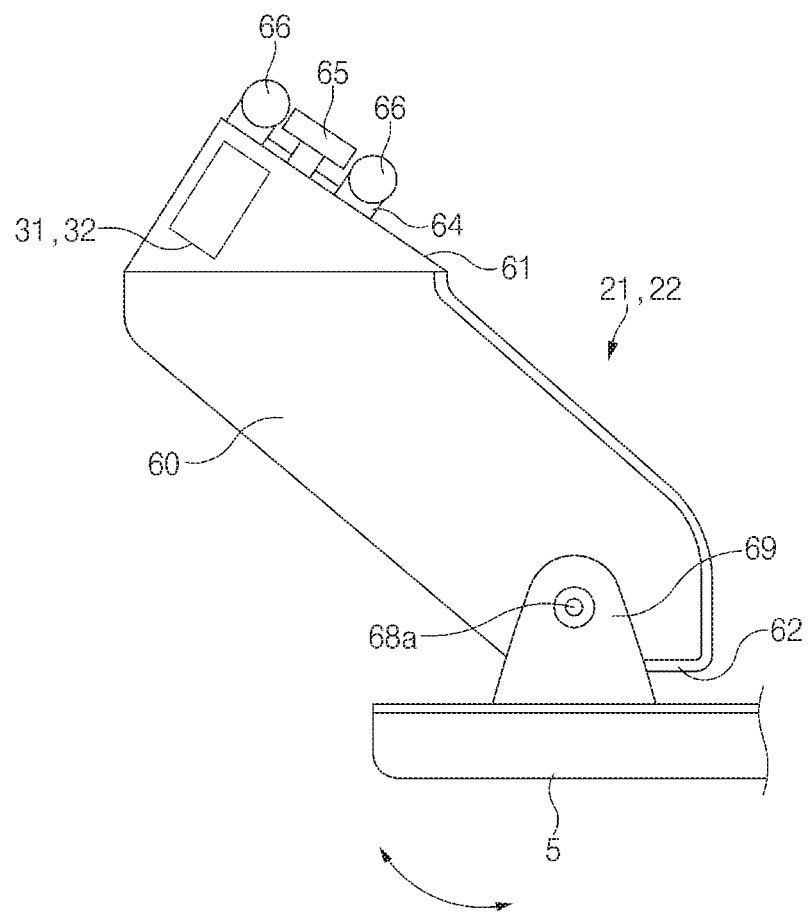
FIG. 8 illustrates an upper roller unit and a lower roller unit in a vehicle door opening and closing apparatus according to another exemplary embodiment of the present disclosure.

According to another exemplary embodiment, as illustrated in FIGS. 8 and 9, the first end portion 61 of the body 60 may be fixed to the roller bracket 64, and the second end portion 62 of the body 60 may be pivotally connected to the vehicle door 5 through a pivot pin 68a. Thus, the vehicle door 5 may swing around the pivot pin 68a adjacent to the second end portion 62 of the body 60.

Referring to FIGS. 8 and 9, the roller bracket 64 may be fixed to the first end portion 61 of the body 60 by welding, using fasteners, and/or the like. The second end portion 62 of the body 60 may be pivotally connected to the vehicle door 5 through the pivot pin 68a. A pivot lug 69 may be mounted to the vehicle door 5 by welding, using fasteners, and/or the like. The pivot lug 69 may protrude toward the body 60. The pivot lug 69 may be pivotally connected to the second end portion 62 of the body 60 through the pivot pin 68a. The second end portion 62 of the body 60 may be shaped so as not to interfere with the vehicle door 5 when the vehicle door 5 swings. The upper rotation axis CX1 and the lower rotation axis CX2 may be defined by the pivot pin 68a. For example, the upper rotation axis CX1 and the lower rotation axis CX2 may be a virtual axis extending vertically along a center point of the pivot pin 68a, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

Referring to FIG. 9, when the upper hold lock 31 firmly holds the roller bracket 64 of the upper roller unit 21 in the first closed position CP1, and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22. Thus, the vehicle door 5 may move between the second closed position CP2 in which the vehicle door 5 is closed and the second open position OP2 in which the vehicle door 5 is opened.

According to the exemplary embodiment illustrated in FIGS. 8 and 9, as the pivot pin 68a is located between the second end portion 62 of the body 60 and the vehicle door 5, the rotation axes CX1 and CX2 of the vehicle door 5 may be relatively close to the vehicle door 5. Since a rotation radius R2 of the vehicle door 5 is relatively shortened, a gap S2 between the vehicle door 5 and another adjacent door 4 may be relatively reduced, resulting in improved exterior styling. Even though the rotation axes CX1 and CX2 of the vehicle door 5 are close to the vehicle door 5, a swing trajectory T2 of the vehicle door 5 is not reduced, and thus an open space created by the swing of the vehicle door 5 may not be narrowed.

Figure 11:
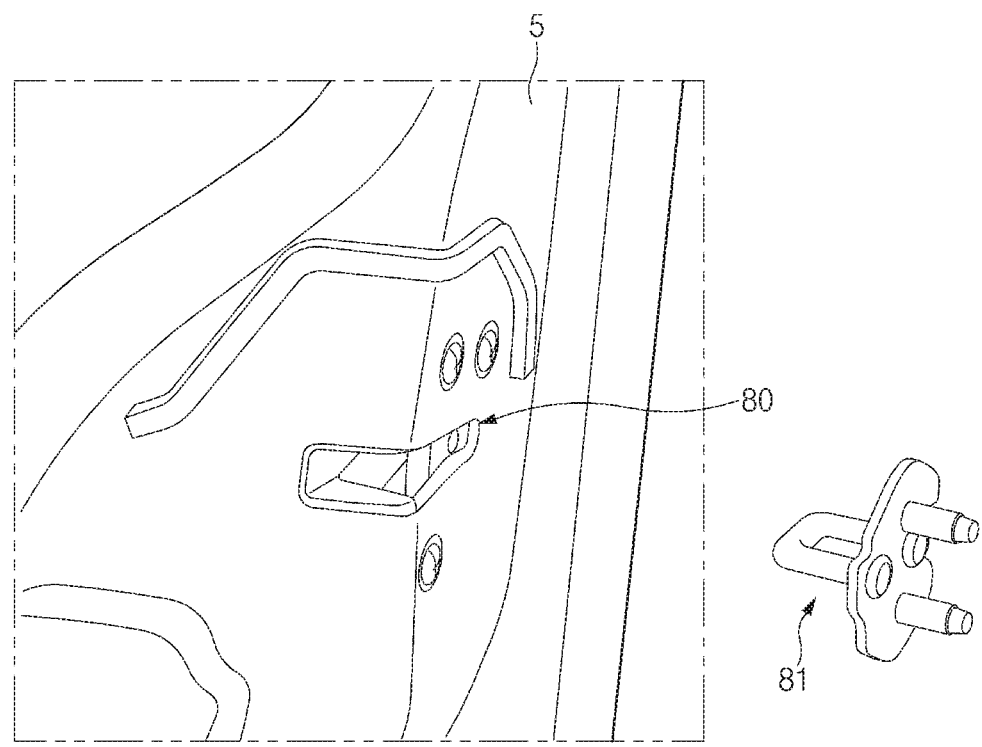
FIG. 11 illustrates a main latch mounted on a vehicle door and a main striker.

Referring to FIG. 11, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the main latch 80 may release the main striker 81 by a release operation of the outside handle 6 so that the vehicle door 5 may be allowed to move in the sliding mode or the swing mode. When the vehicle door 5 is held in the first closed position CP1 and the main latch 80 releases the main striker 81, a center roller unit 23 may be released from the center rail 13, and thus the vehicle door 5 may be opened and closed in the swing mode.

The vehicle door opening and closing apparatus, according to exemplary embodiments of the present disclosure, may further include the center rail 13 mounted at a central portion of the vehicle body 1, and the center roller unit 23 guided along the center rail 13.

Referring to FIGS. 1 and 3, the center rail 13 may extend from a rear edge of the door aperture 3 in the longitudinal direction of the vehicle. The center roller unit 23 may be pivotally mounted at a central portion of the vehicle door 5. In particular, the center roller unit 23 may be mounted in a position adjacent to the rear end of the vehicle door 5. The center roller unit 23 may be guided along the center rail 13.

Figure 12:
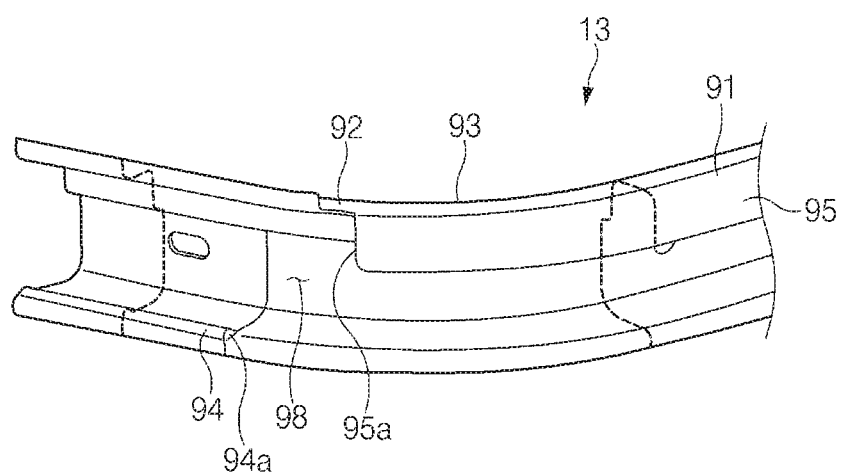
FIG. 12 illustrates a perspective view of a center rail in a vehicle door opening and closing apparatus according to an exemplary embodiment of the present disclosure.

Referring to FIG. 12, the center rail 13 may include a sliding guide 91 extending straightly in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 13:
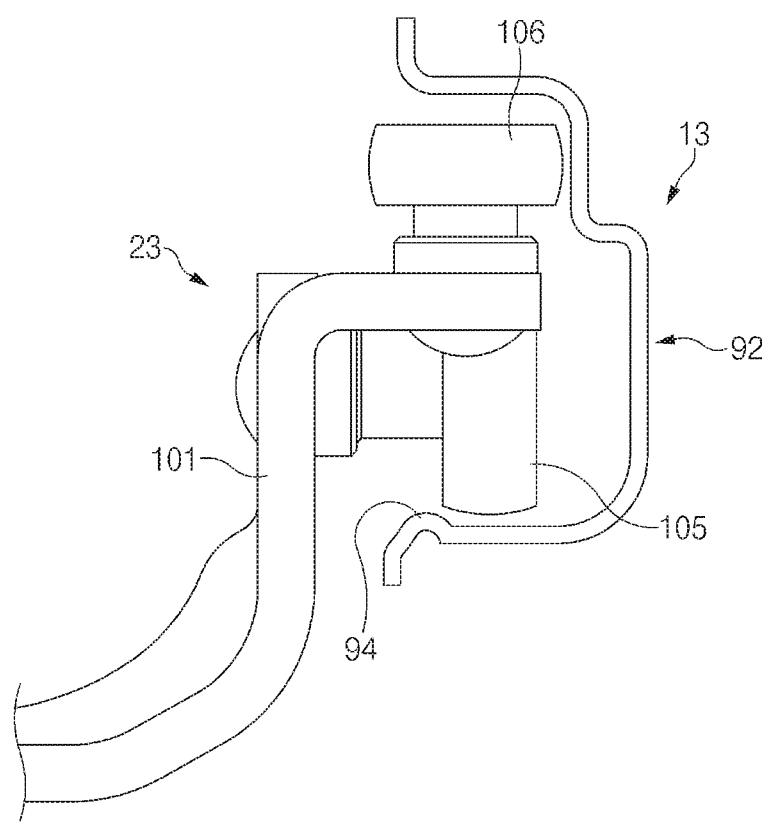
FIG. 13 illustrates a cross-sectional view of a swing guide of a center rail.
Figure 14:
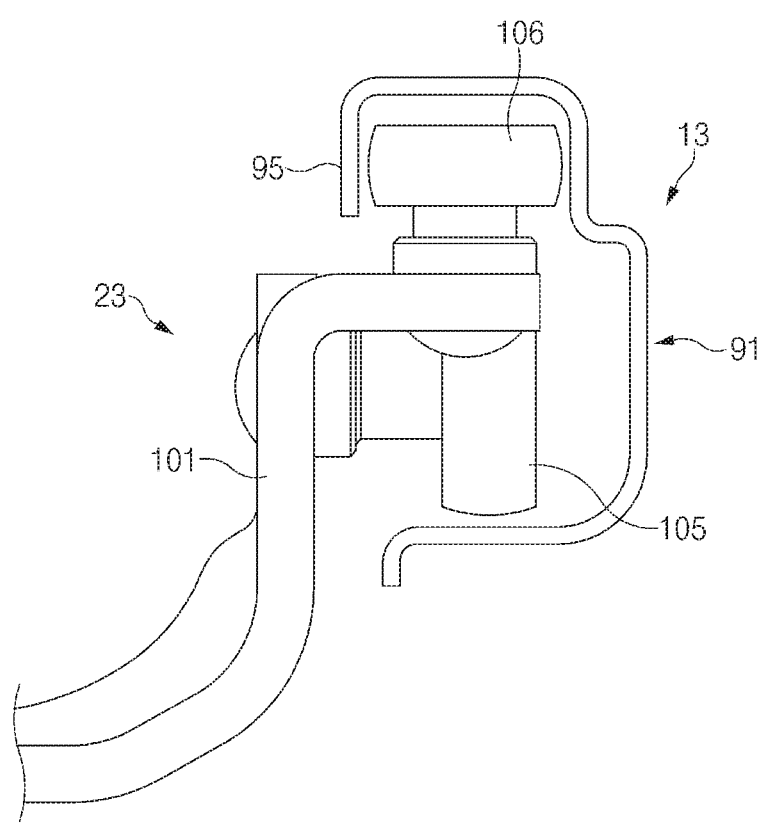
FIG. 14 illustrates a cross-sectional view of a sliding guide of a center rail.
Figure 15:
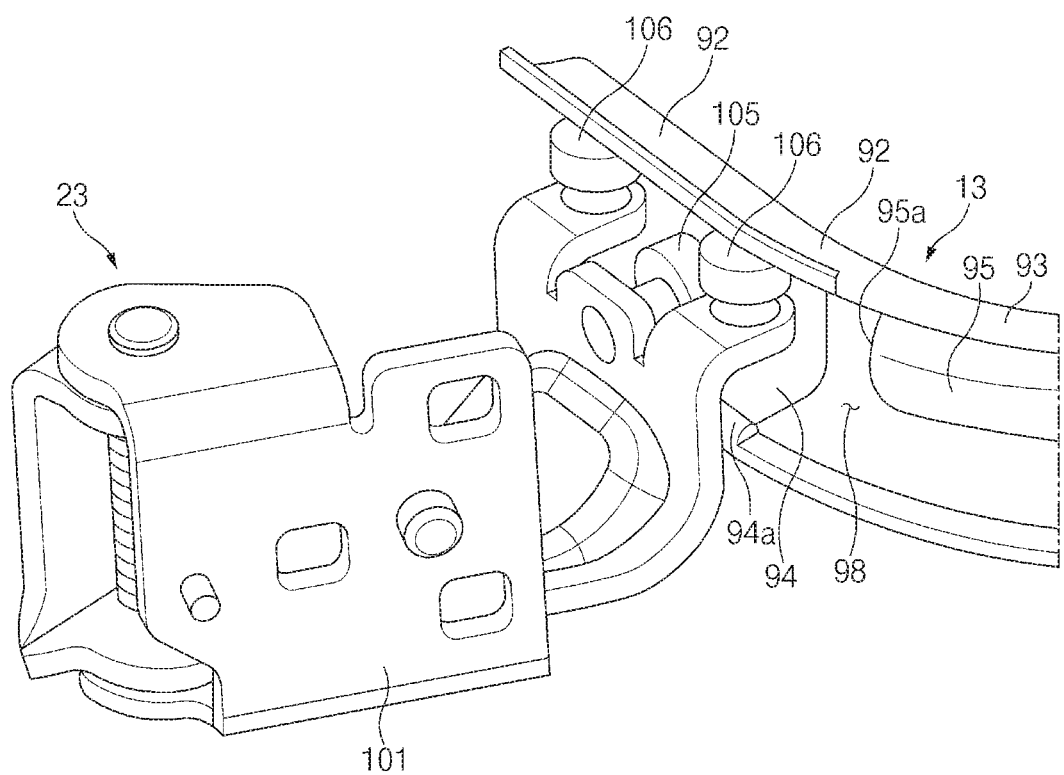
FIG. 15 illustrates a structure in which a center roller unit is held in a swing guide of a center rail.

Referring to FIGS. 13 to 15, the center roller unit 23 may include a roller bracket 101 and rollers 105 and 106 rotatably mounted on the roller bracket 101. The roller bracket 101 may be pivotally mounted at the central portion of the vehicle door 5. The rollers 105 and 106 may roll along the center rail 13. As illustrated in FIG. 15, a middle roller 105 and two side rollers 106 disposed on both sides of the middle roller 105 may be rotatably mounted on the roller bracket 101. A rotation axis of the middle roller 105 may be orthogonal to a rotation axis of the side roller 106.

When the vehicle door 5 slides in the longitudinal direction of the vehicle as the sliding mode is selected, the sliding guide 91 may guide the center roller unit 23.

Referring to FIGS. 12 and 14, the sliding guide 91 may include a stopper wall 95 preventing the rollers 105 and 106 of the center roller unit 23 from being separated from the sliding guide 91. The stopper wall 95 may extend along a length of the sliding guide 91 and a length of the bending portion 93. The stopper wall 95 may protrude vertically downward from the top of the sliding guide 91. As the stopper wall 95 closes an upper area of the sliding guide 91 and an upper area of the bending portion 93, the center roller unit 23 may be prevented from moving away from the sliding guide 91 toward the exterior side of the vehicle as illustrated in FIG. 14.

When the vehicle door 5 is opened and closed in the swing mode as the swing mode is selected, the swing guide 92 may guide the rollers 105 and 106 of the center roller unit 23 to be released from the center rail 13.

An exterior side of the swing guide 92 may be entirely opened toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along the swing trajectory T1 or T2, the middle roller 105 of the center roller unit 23 may be guided along the guide projection 94 as illustrated in FIG. 13.

Figure 16:
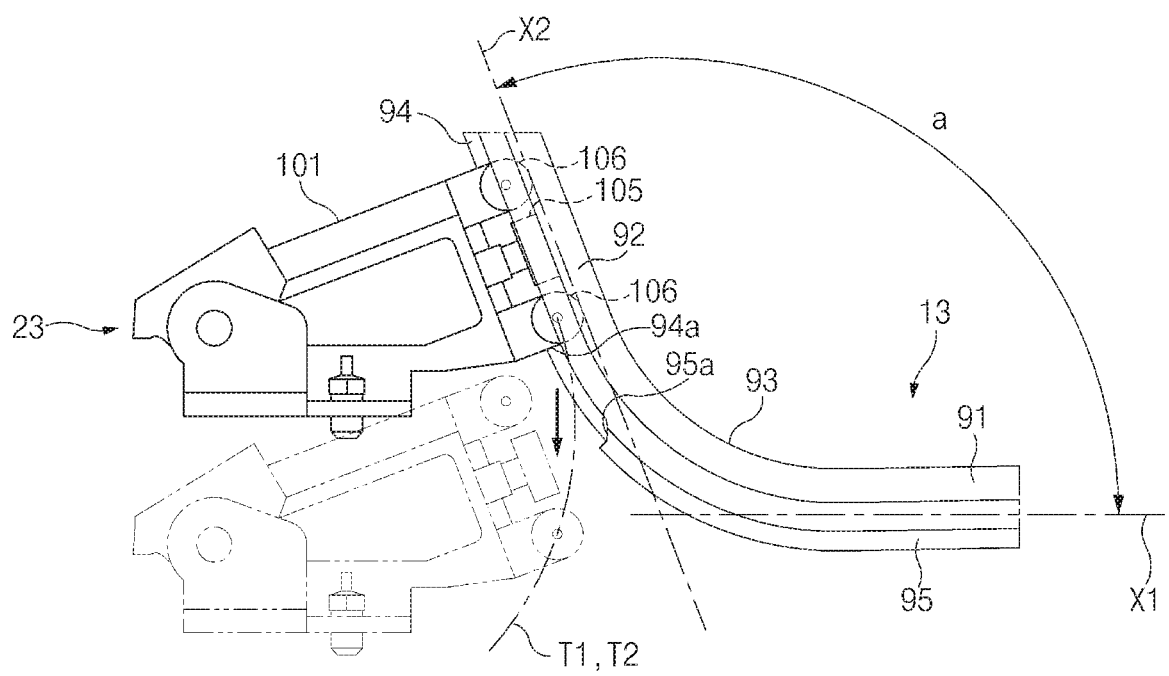
FIG. 16 illustrates an operation in which a center roller unit is released from a swing guide of a center rail.

A front end 95a of the stopper wall 95 of the sliding guide 91 and a rear end 94a of the guide projection 94 may be located so as not to interfere with the swing trajectories T1 and T2 of the vehicle door 5. In addition, as illustrated in FIG. 16, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the center roller unit 23 may easily be released from the swing guide 92 of the center rail 13 or may easily be held in the swing guide 92 of the center rail 13. The center rail 13 may include a space 98 allowing the rollers 105 and 106 of the center roller unit 23 to be released from the center rail 13 or be held in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Thus, there is no interference when the rollers 105 and 106 of the center roller unit 23 are released from the center rail 13 or are held in the center rail 13 in the swing mode.

Figure 17:
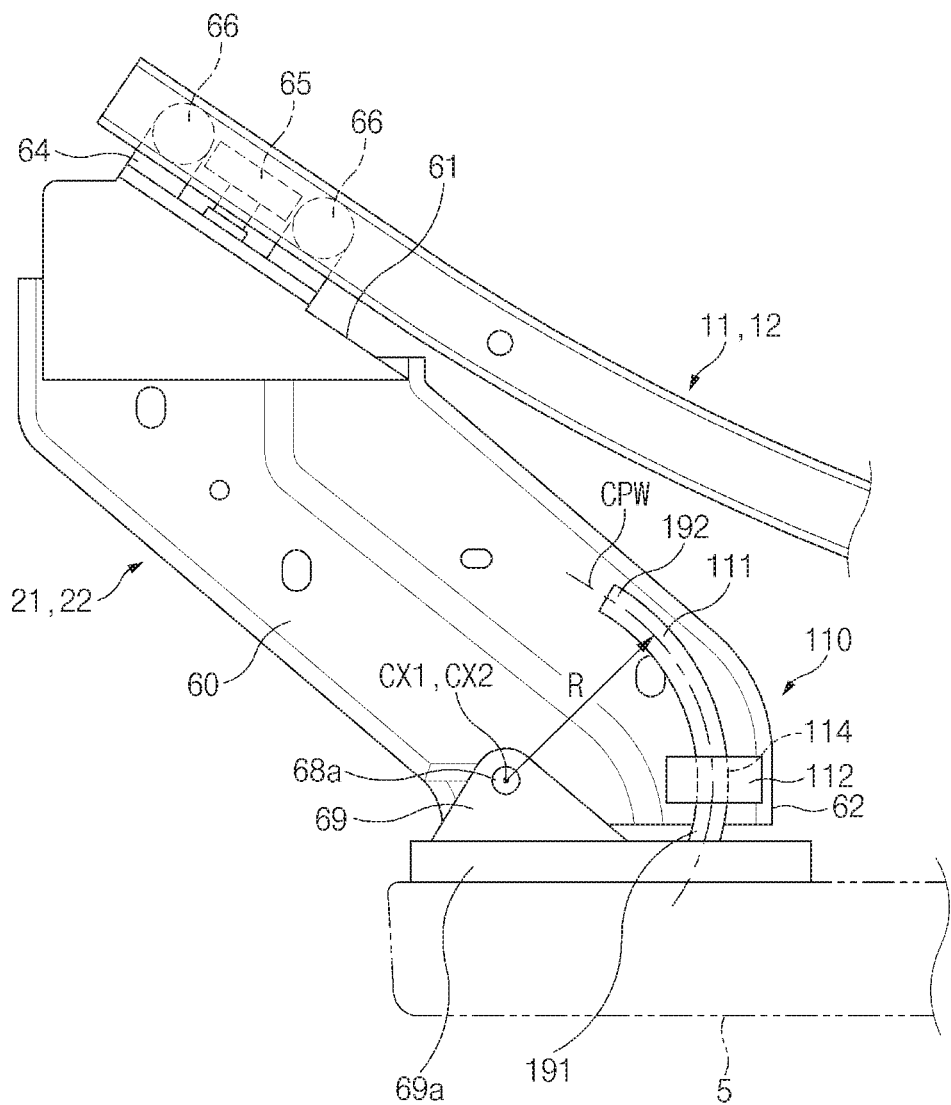
FIG. 17 illustrates a vehicle door check mechanism mounted on a vehicle door opening and closing apparatus according to an exemplary embodiment of the present disclosure.
Figure 18:
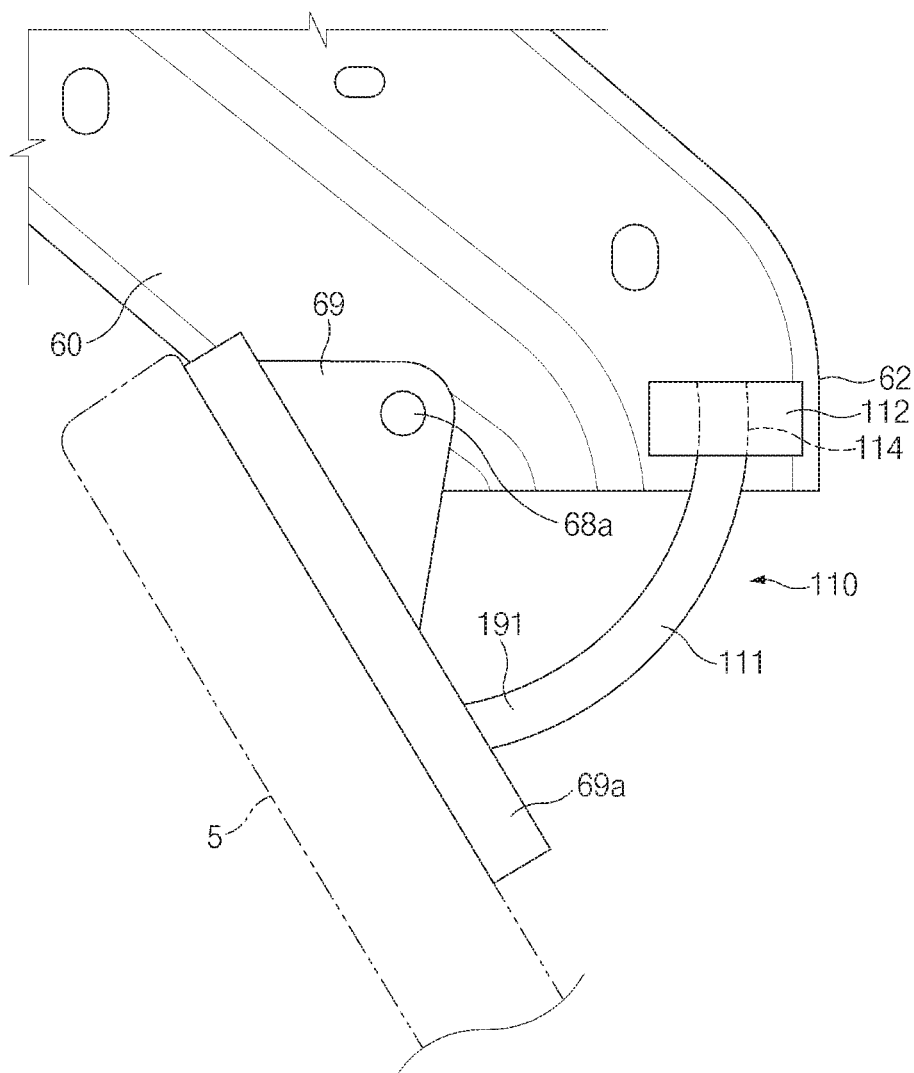
FIG. 18 illustrates a state of a strap body of the vehicle door check mechanism when the vehicle door illustrated in FIG. 17 is opened in a swing mode.

Referring to FIGS. 17 and 18, a vehicle door check mechanism 110 may be disposed between the vehicle door 5 and the rails 11 and 12 of the vehicle body to allow vehicle door 5 to be held and stopped at regular intervals. When the vehicle door 5 is opened in the swing mode, the vehicle door check mechanism 110 may allow the vehicle door 5 to be held and stopped at predetermined intervals.

The vehicle door check mechanism 110 may include a strap body 111 mounted on portions of the vehicle door 5 adjacent to the rotation axes CX1 and CX2. Referring to FIGS. 17 to 28, the pivot lug 69 may have a mounting portion 69a. The mounting portion 69a may be mounted to the vehicle door 5 by welding, using fasteners, and/or the like. Specifically, the strap body 111 may be mounted to the vehicle door 5 or the mounting portion 69a of the pivot lug 69, and the strap body 111 may move with the vehicle door 5 when the vehicle door 5 swings around the rotation axes CX1 and CX2. As illustrated in FIGS. 17 and 18, the strap body 111 may have a fixed end 191 fixed to the pivot lug 69 or the vehicle door 5, and a free end 192 spaced apart from the vehicle door 5.

The strap body 111 may be curved to have a predetermined curvature radius R, and the center of the curvature radius R of the strap body 111 may be located on the rotation axes CX1 and CX2 of the vehicle door 5. When the vehicle door 5 swings around the rotation axes CX1 and CX2, the strap body 111 may move along a circular pathway CPW defined by the swing trajectory of the vehicle door 5.

The vehicle door check mechanism 110, according to exemplary embodiments of the present disclosure, may include a guide member 112 guiding the movement of the strap body 111. The guide member 112 may be mounted on the body 60 of the roller units 21 and 22. The guide member 112 may have a guide passage 114 through which the strap body 111 passes, and the guide passage 114 may be shaped to correspond to a cross section of the strap body 111.

When the vehicle door 5 is opened and closed in the swing mode, a hold unit allowing the strap body 111 to be held and stopped at regular intervals may be mounted on the roller units 21 and 22. Specific examples of the hold unit will be illustrated in FIGS. 19 to 28.

As such, the vehicle door check mechanism 110 may allow the vehicle door 5 to be held and stopped at regular intervals when the vehicle door 5 moves along the swing trajectory.

Figure 19:
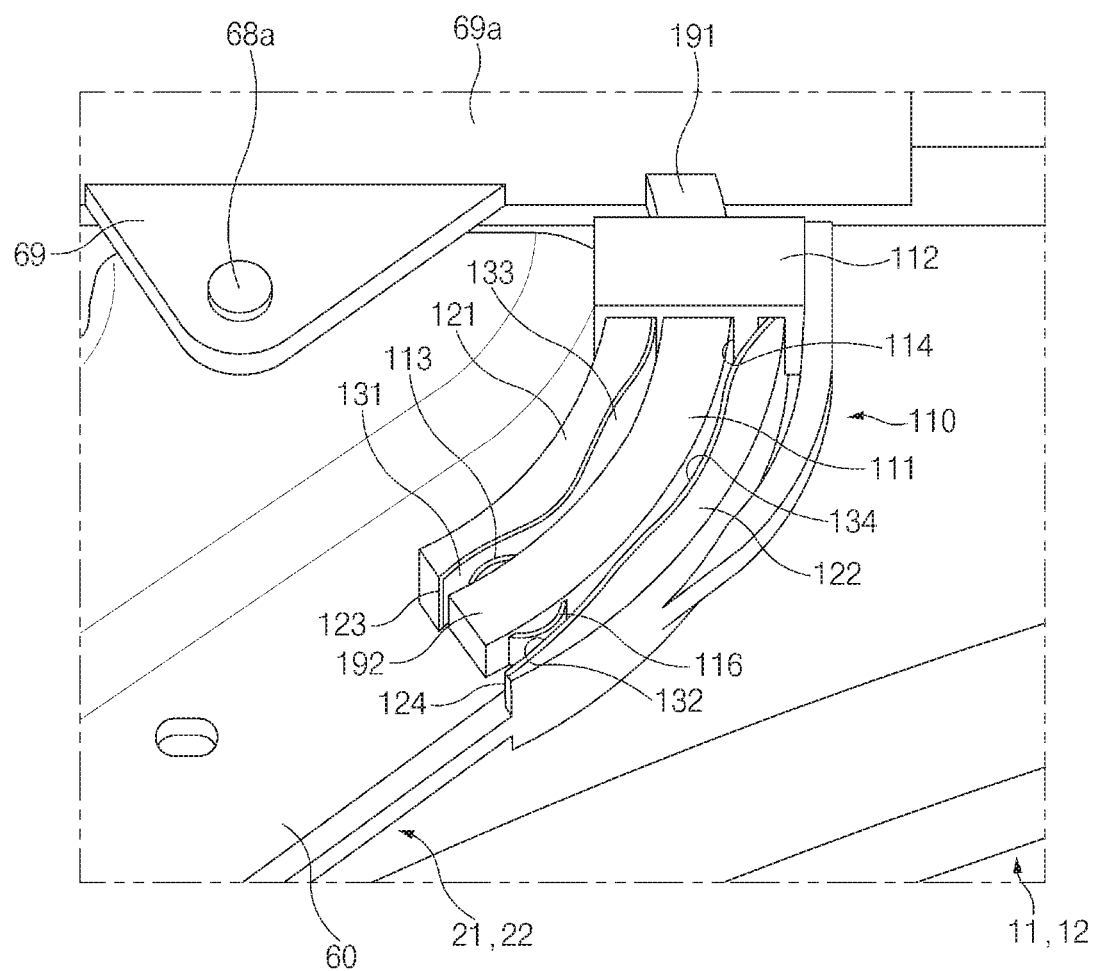
FIG. 19 illustrates a perspective view of a vehicle door check mechanism according to an exemplary embodiment of the present disclosure.
Figure 20:
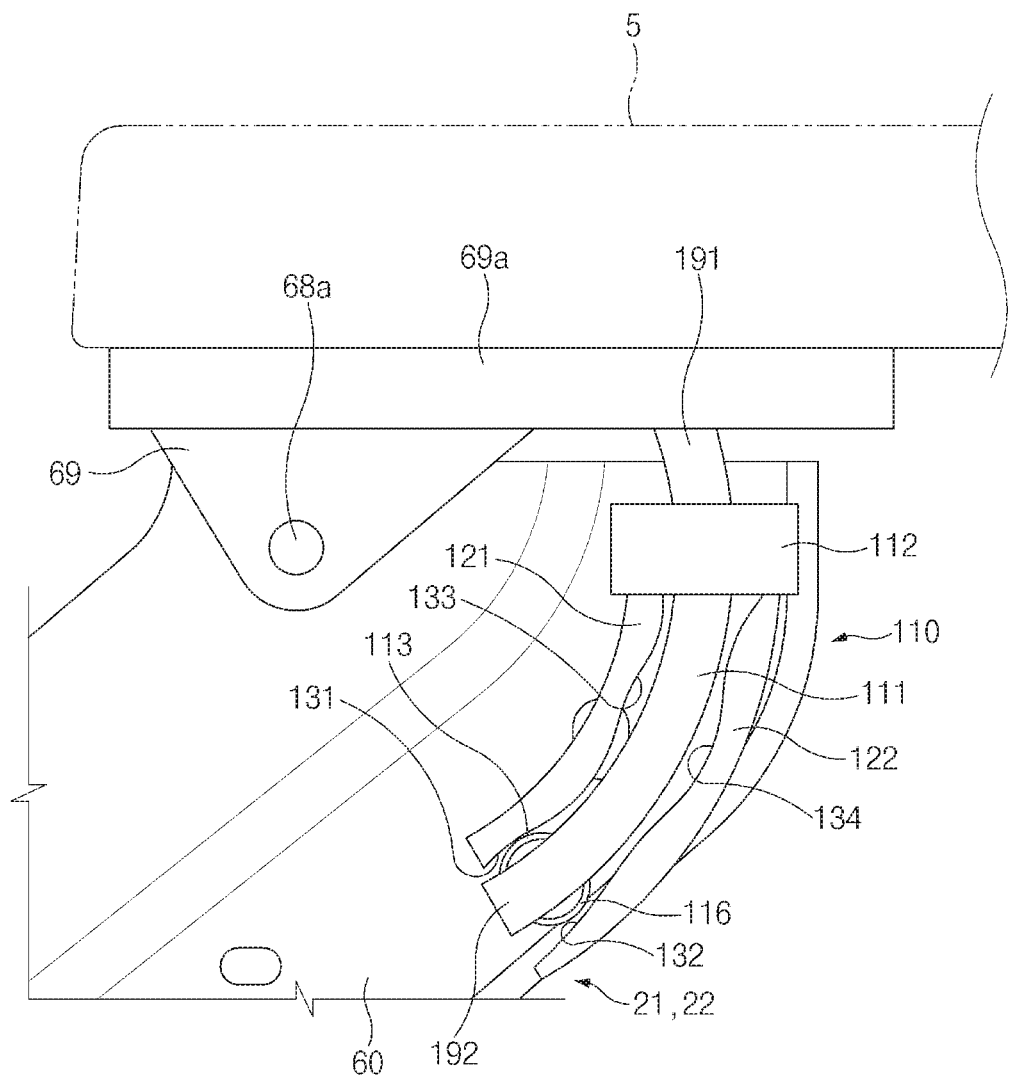
FIG. 20 illustrates a state of the strap body illustrated in FIG. 19 when a vehicle door is closed in a swing mode.
Figure 21:
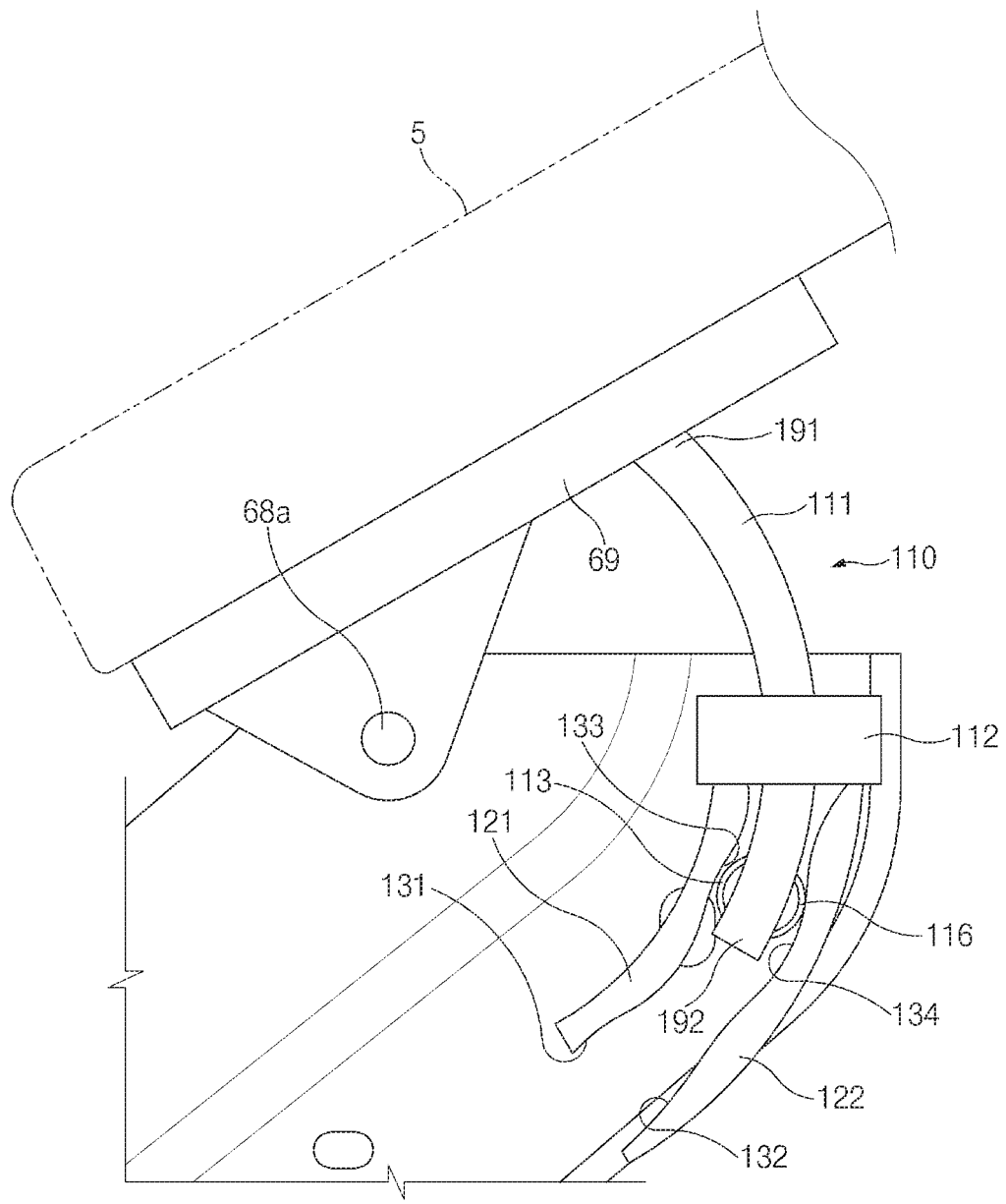
FIG. 21 illustrates a state of the strap body illustrated in FIG. 19 when a vehicle door is opened in a swing mode.
Figure 22:
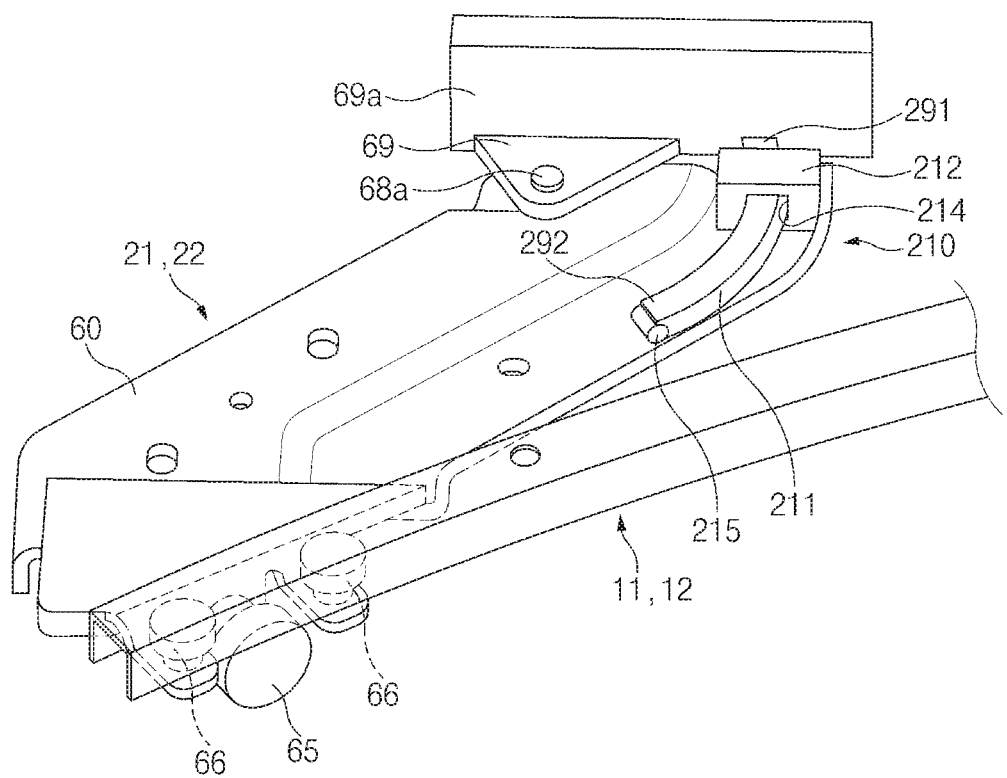
FIG. 22 illustrates a perspective view of a vehicle door check mechanism according to another exemplary embodiment of the present disclosure.
Figure 23:
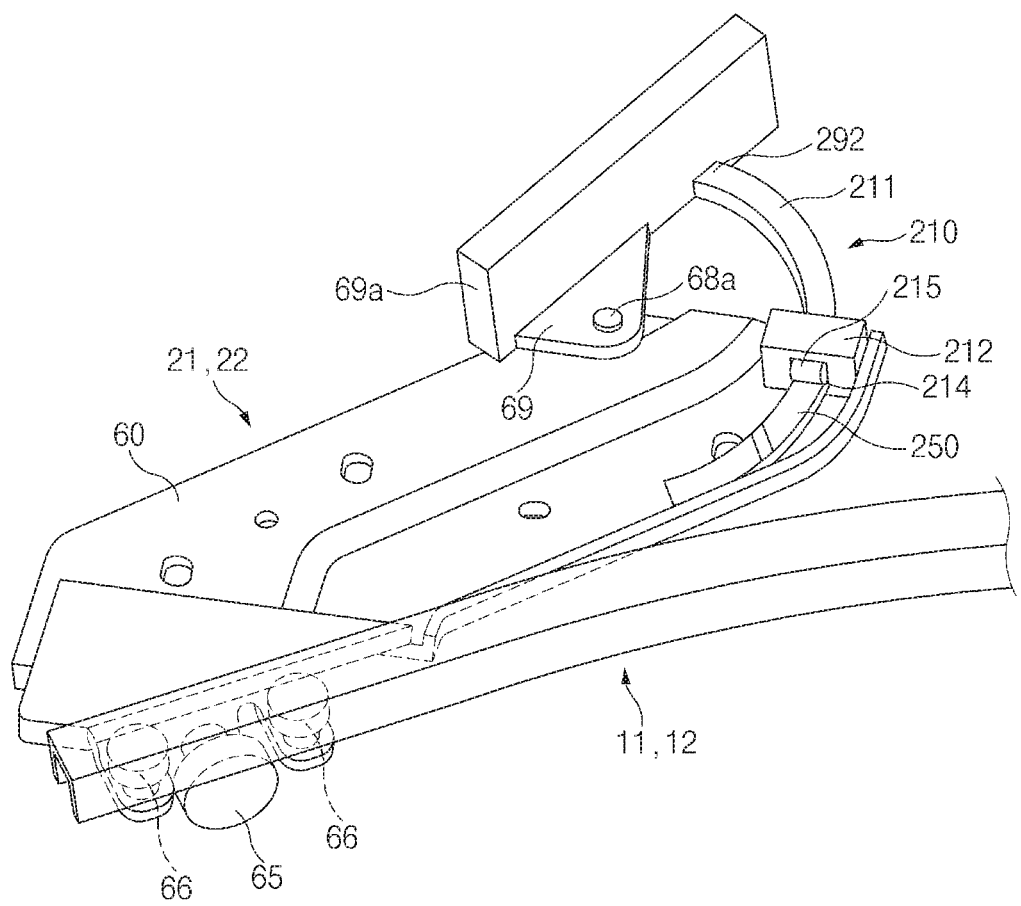
FIG. 23 illustrates a perspective view of the strap body illustrated in FIG. 22 when a vehicle door is opened in a swing mode.
Figure 24:
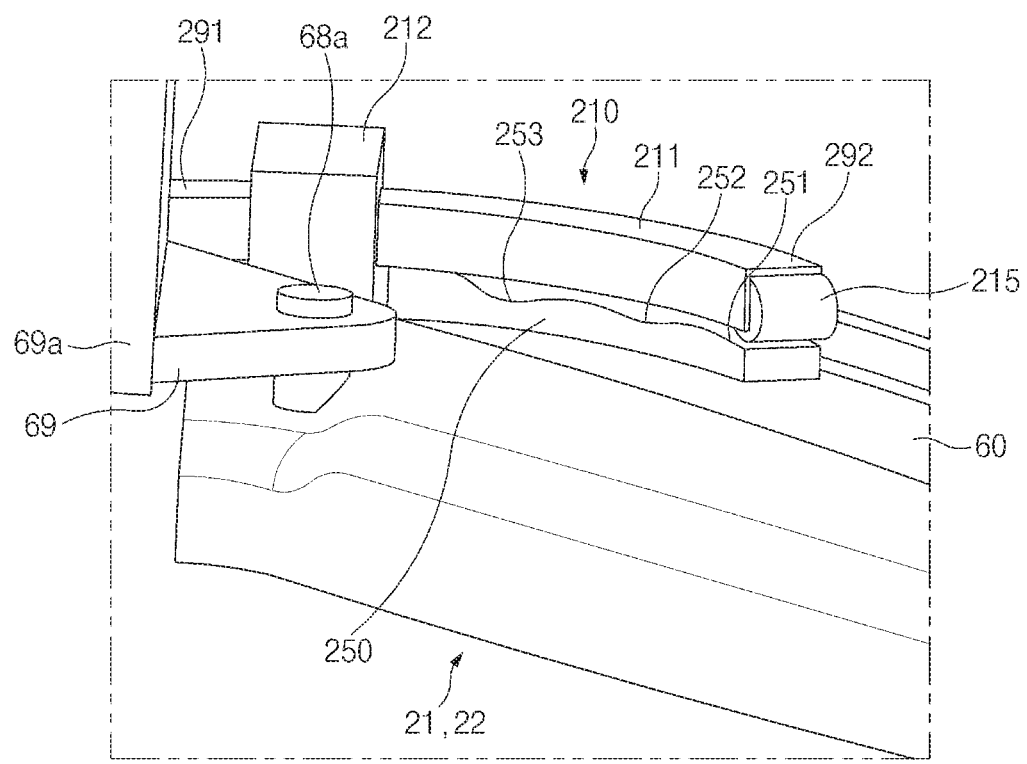
FIG. 24 illustrates a perspective view of the strap body illustrated in FIG. 22 which has moved on a hold member when a vehicle door is closed in a swing mode.
Figure 25:
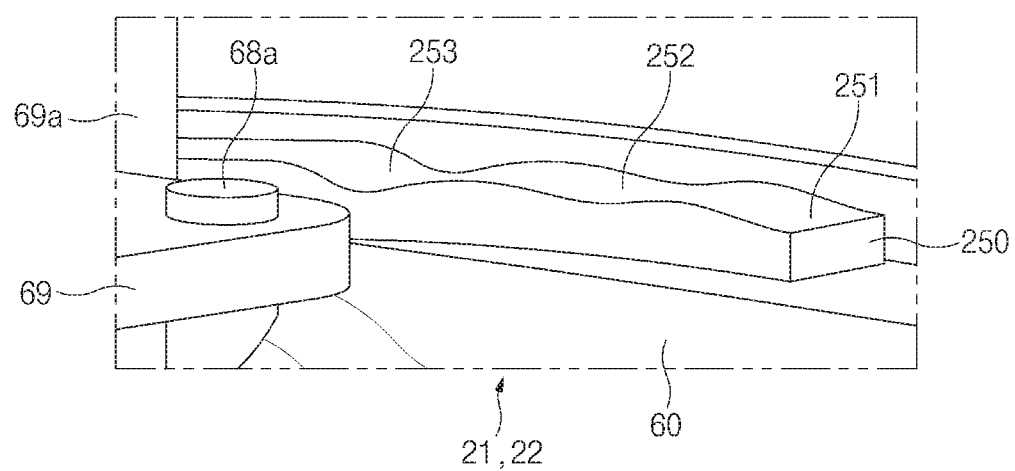
FIG. 25 illustrates a perspective view of the hold member of the vehicle door check mechanism illustrated in FIG. 22.

Referring to FIGS. 19 to 21, the vehicle door check mechanism 110 may include a first hold member 121 and a second hold member 122 disposed on both sides of the strap body 111, and the first hold member 121 and the second hold member 122 may be curved to correspond to the curvature of the strap body 111. The first hold member 121 and the second hold member 122 may be mounted on the body 60 of the roller units 21 and 22. The first hold member 121 may have a plurality of recesses 131 and 133, and the plurality of recesses 131 and 133 may be spaced apart from each other in a longitudinal direction of the first hold member 121. The second hold member 122 may have a plurality of recesses 132 and 134 corresponding to the plurality of recesses 131 and 133 of the first hold member 121, respectively, and the plurality of recesses 132 and 134 may be spaced apart from each other in a longitudinal direction of the second hold member 122. For example, a first recess 131 of the first hold member 121 may be spaced apart from a second recess 132 of the second hold member 122 in a radial direction of the circular pathway CPW, and a third recess 133 of the first hold member 121 may be spaced apart from a fourth recess 134 of the second hold member 122 in the radial direction of the circular pathway CPW.

The strap body 111 may have a first projection 113 protruding from the free end 192 toward the first hold member 121, and a second projection 116 protruding from the free end 192 toward the second hold member 122. The first projection 113 and the second projection 116 may be semicircular. The first projection 113 may be selectively received in any one of the recesses 131 and 133 of the first hold member 121, and the second projection 116 may be selectively received in any one of the recesses 132 and 134 of the second hold member 122.

The first hold member 121 may have a first cushion material 123 contacting the first projection 113, and the first cushion material 123 may be attached to the first hold member 121 by coating and/or the like. The second hold member 122 may have a second cushion material 124 contacting the second projection 116, and the second cushion material 124 may be attached to the second hold member 122 by coating and/or the like. For example, the first cushion material 123 and the second cushion material 124 may be polyoxymethylene (POM). Durability and operability of the vehicle door check mechanism 110 may be improved by the first and second cushion materials 123 and 124.

As illustrated in FIG. 20, in a condition in which the vehicle door 5 is closed, the first projection 113 of the strap body 111 may be received in the first recess 131 of the first hold member 121, and the second projection 116 of the strap body 111 may be received in the second recess 132 of the second hold member 122 so that the strap body 111 may be held and stopped in a first position. As illustrated in FIG. 21, in a condition in which the vehicle door 5 is partially opened, the first projection 113 of the strap body 111 may be received in the third recess 133 of the first hold member 121, and the second projection 116 of the strap body 111 may be received in the fourth recess 134 of the second hold member 122 so that the strap body 111 may be held and stopped in a second position. In a condition in which the vehicle door 5 is fully opened, the first projection 113 and the second projection 116 of the strap body 111 may be stopped by the guide member 112.

FIGS. 22 to 25 illustrate a vehicle door check mechanism 210 according to another exemplary embodiment of the present disclosure. Here, the vehicle door check mechanism 210 may include a strap body 211 having a fixed end 291 and a free end 292, a roller 215 rotatably mounted on the free end 292 of the strap body 211, and a hold member 250 mounted on the body 60 of the roller units 21 and 22.

The strap body 211 may be mounted on portions of the vehicle door 5 adjacent to the rotation axes CX1 and CX2 in the same manner as in the preceding embodiment. Specifically, the strap body 211 may be mounted on the pivot lug 69 or the vehicle door 5, and the strap body 211 may move with the vehicle door 5 when the vehicle door 5 swings around the rotation axes CX1 and CX2. The fixed end 291 may be fixed to the mounting portion 69*a* of the pivot lug 69 or the vehicle door 5, and the free end 292 may be spaced apart from the vehicle door 5.

The hold member 250 may be curved to correspond to the curvature of the strap body 211, and the hold member 250 may be located below the strap body 211. The hold member 250 may be attached to the body 60 of the roller units 21 and 22.

The hold member 250 may have a plurality of recesses 251, 252, and 253, and the plurality of recesses 251, 252, and 253 may be spaced apart from each other in a longitudinal direction of the hold member 250.

When the vehicle door 5 is opened and closed in the swing mode, the roller 215 may roll along the hold member 250, and the roller 215 may be selectively received in any one of the recesses 251, 252, and 253 of the hold member 250, and thus the strap body 211 may be held and stopped at regular intervals.

Figure 26:
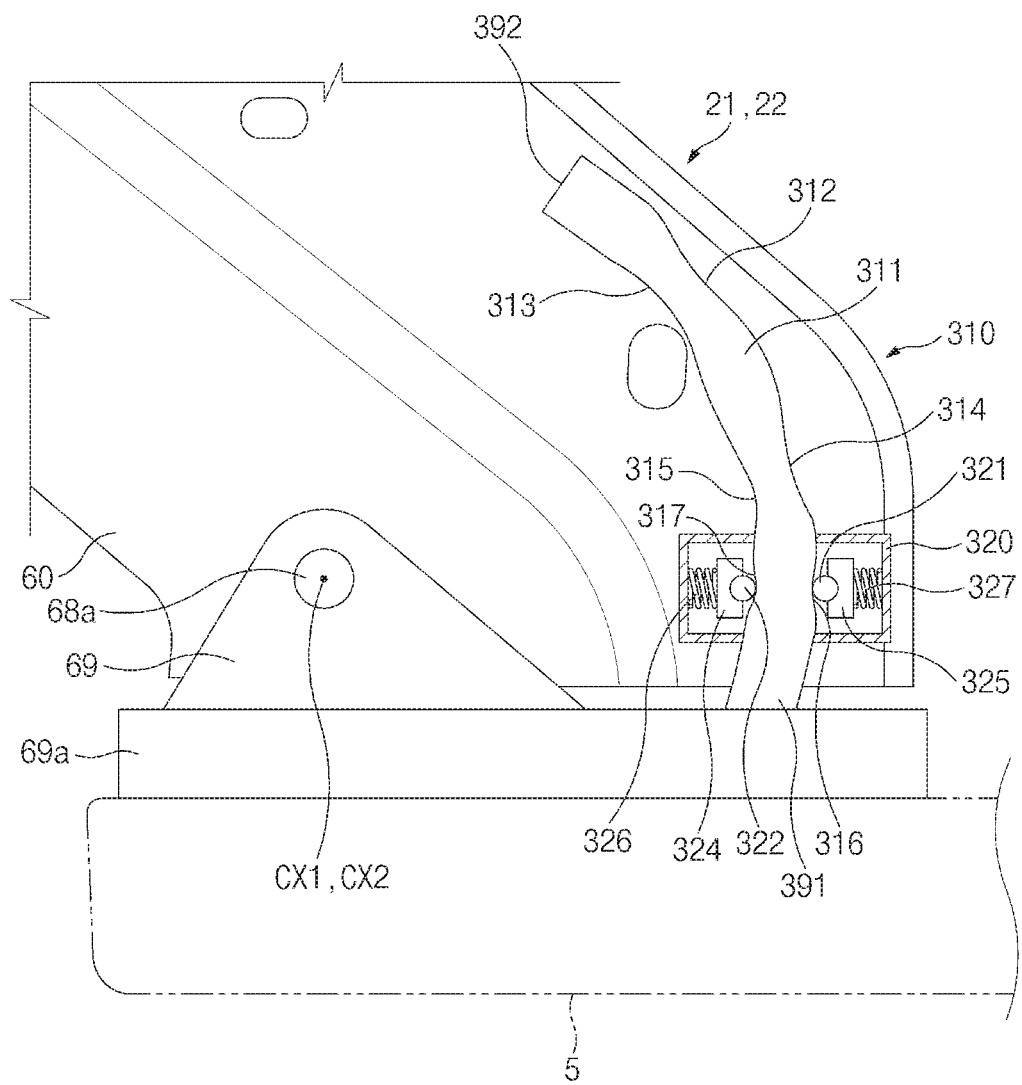
FIG. 26 illustrates a vehicle door check mechanism according to another exemplary embodiment of the present disclosure.

Referring to FIG. 26, a vehicle door check mechanism 310 according to another exemplary embodiment of the present disclosure may include a strap body 311 mounted on the vehicle door 5, and a strap housing 320 allowing the strap body 311 to be held and stopped at regular intervals.

The strap body 311 may be mounted on portions of the vehicle door 5 adjacent to the rotation axes CX1 and CX2 in the same manner as in the preceding embodiment. Specifically, the strap body 311 may be mounted on the pivot lug 69 or the vehicle door 5, and the strap body 311 may move with the vehicle door 5 when the vehicle door 5 swings around the rotation axes CX1 and CX2. The strap body 311 may have a fixed end 391 fixed to the mounting portion 69*a* of the pivot lug 69 or the vehicle door 5, and a free end 392 spaced apart from the vehicle door 5.

The strap body 311 may have an inner peripheral surface facing the rotation axes CX1 and CX2 of the vehicle door 5, that is, the pivot lug 69, and an outer peripheral surface opposing the inner peripheral surface. The strap body 311 may have a plurality of inner peripheral recesses 313, 315, and 317 facing the rotation axes CX1 and CX2 of the vehicle door 5, and a plurality of outer peripheral recesses 312, 314, and 316 opposing the plurality of inner peripheral recesses 313, 315, and 317. The plurality of inner peripheral recesses 313, 315, and 317 may be spaced apart from each other along the inner peripheral surface of the strap body 311, and the plurality of outer peripheral recesses 312, 314, and 316 may be spaced apart from each other along the outer peripheral surface of the strap body 311.

The strap housing 320 may be mounted on the body 60 of the roller units 21 and 22, and the strap housing 320 may have a passage through which the strap body 311 passes. Thus, the strap housing 320 may guide the movement of the strap body 311.

A first ball 321 and a second ball 322 may be mounted in the strap housing 320, allowing the strap body 311 to be held and stopped at regular intervals. The first ball 321 may be selectively received in any one of the outer peripheral recesses 312, 314, and 316 of the strap body 311, and the second ball 322 may be selectively received in any one of the inner peripheral recesses 313, 315, and 317 of the strap body 311.

The first ball 321 may be supported by a first ball support 325, and the first ball support 325 may be elastically supported by a first elastic member 327. The second ball 322 may be supported by a second ball support 324, and the second ball support 324 may be elastically supported by a second elastic member 326.

When the vehicle door 5 is opened and closed in the swing mode, the first ball 321 and the second ball 322 of the strap housing 320 may be symmetrically received in the recesses 312, 313, 314, 315, 316, and 317 of the strap body 311, and thus the strap body 311 may be held and stopped at regular intervals.

According to the exemplary embodiment illustrated in FIG. 26, the recesses 312, 313, 314, 315, 316, and 317 of the strap body 311 may be arranged in a plane orthogonal to a height direction of the vehicle, and the first ball 321 and the second ball 322 of the strap housing 320 may be oppositely received in corresponding recesses selected from the recesses 312, 313, 314, 315, 316, and 317 of the strap body 311. Thus, the vehicle door check mechanism 310 may operate normally without being affected by deflection or deformation of the vehicle door 5.

Figure 27:
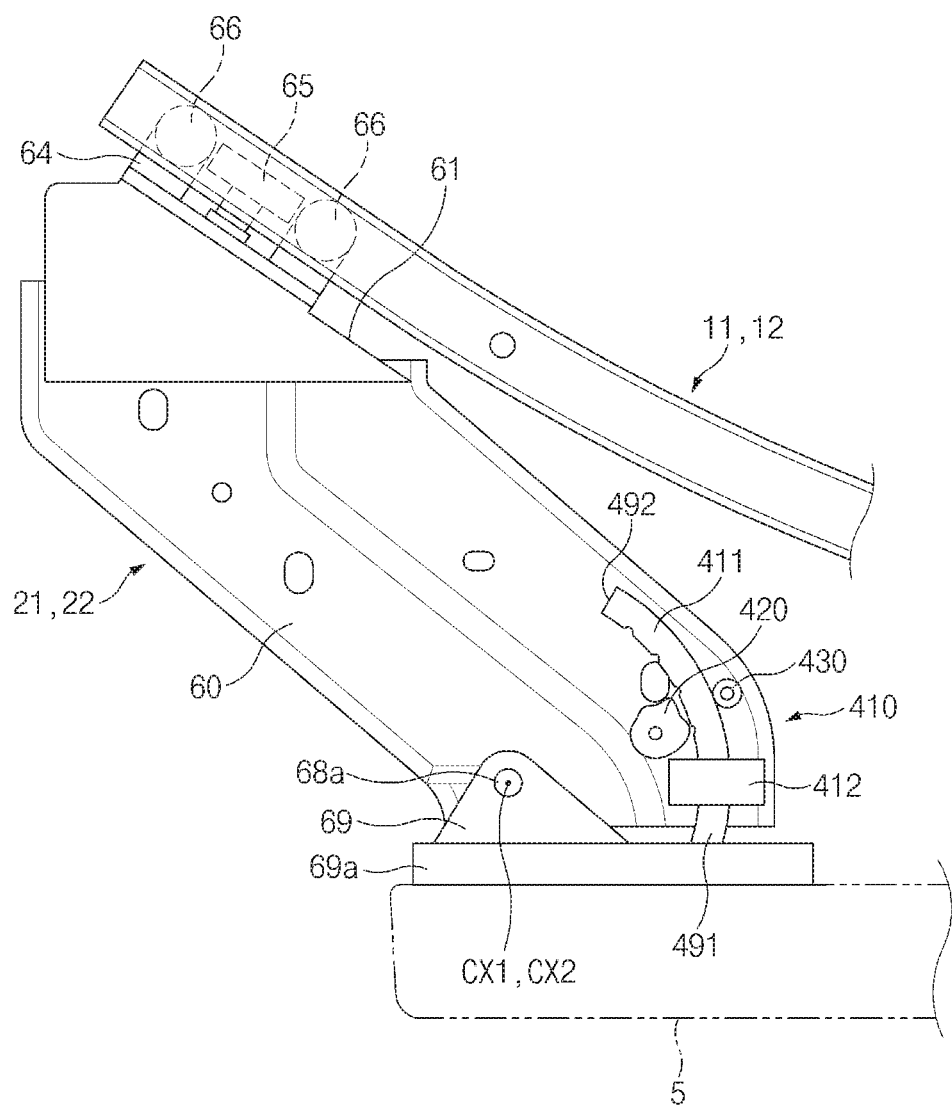
FIG. 27 illustrates a vehicle door check mechanism according to another exemplary embodiment of the present disclosure.
Figure 28:
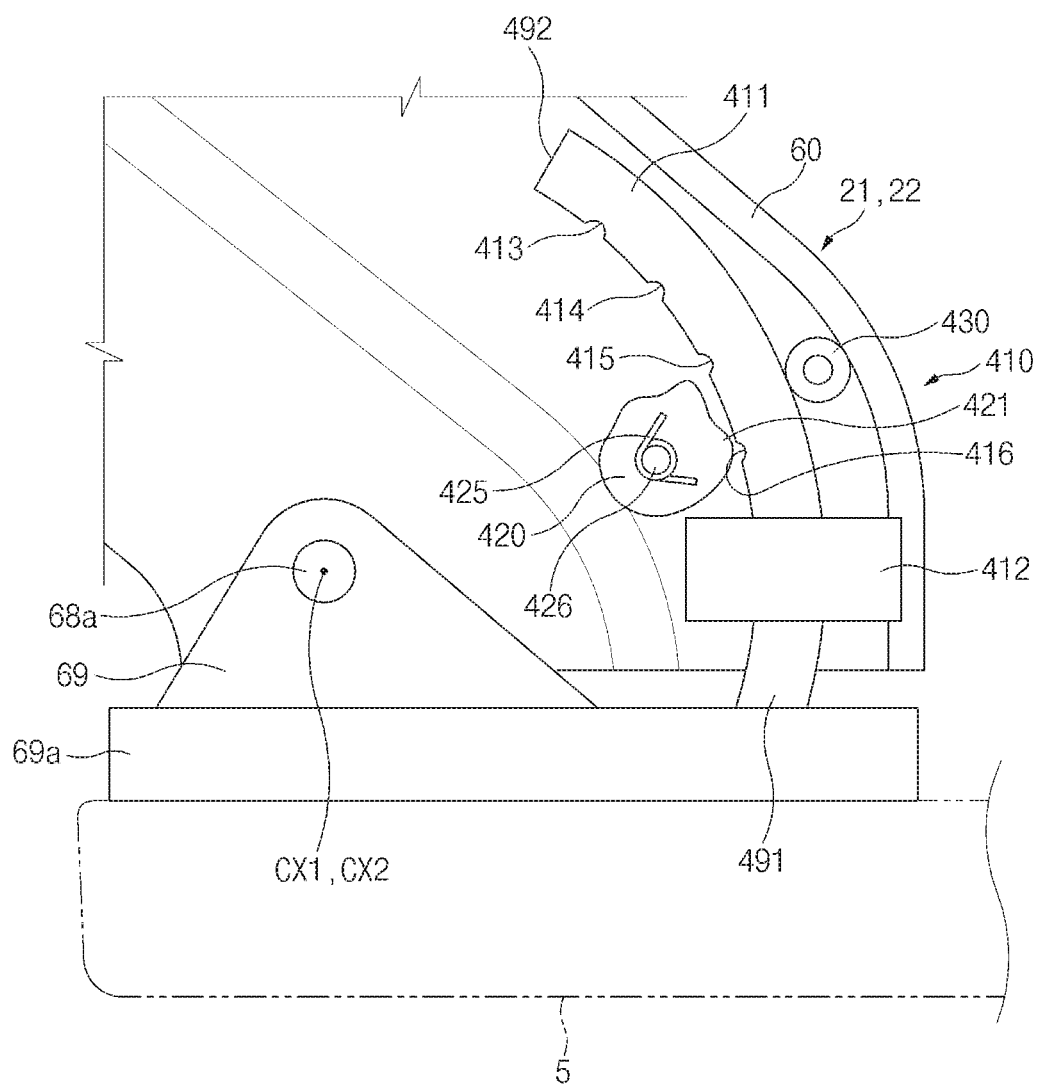
FIG. 28 illustrates an enlarged view of the vehicle door check mechanism illustrated in FIG. 27.

Referring to FIGS. 27 and 28, a vehicle door check mechanism 410 according to another exemplary embodiment of the present disclosure may include a strap body 411 mounted on the vehicle door 5, a cam member 420 allowing the strap body 411 to be held and stopped at regular intervals, and a guide member 412 guiding the movement of the strap body 411.

The strap body 411 may be mounted on portions of the vehicle door 5 adjacent to the rotation axes CX1 and CX2 in the same manner as in the preceding embodiment. Specifically, the strap body 411 may be mounted on the pivot lug 69 or the vehicle door 5, and the strap body 411 may move with the vehicle door 5 when the vehicle door 5 swings around the rotation axes CX1 and CX2. The strap body 411 may have a fixed end 491 fixed to the mounting portion 69a of the pivot lug 69 or the vehicle door 5, and a free end 492 spaced apart from the vehicle door 5.

The strap body 411 may have an inner peripheral surface facing the rotation axes CX1 and CX2 of the vehicle door 5, that is, the pivot lug 69, and an outer peripheral surface opposing the inner peripheral surface. A plurality of recesses 413, 414, 415, and 416 may be spaced apart from each other along the inner peripheral surface of the strap body 411.

The cam member 420 may have a projection 421 selectively received in any one of the recesses 413, 414, 415, and 416 of the strap body 411. The cam member 420 may be rotatably mounted on the body 60 of the roller units 21 and 22 through a shaft 426. In particular, the cam member 420 may allow the projection 421 to be biased toward the recesses 413, 414, 415, and 416 by a biasing element 425. The biasing element 425 may be a torsion spring disposed around the shaft 426.

The vehicle door check mechanism 410 may further include a guide roller 430 guiding the movement of the strap body 411. The guide roller 430 may be rotatably mounted on the body 60 of the roller units 21 and 22. In particular, the guide roller 430 may be disposed to face the cam member 420, and the guide roller 430 may make rolling contact with the outer peripheral surface of the strap body 411.

The guide member 412 may have a guide passage through which the strap body 411 passes and the guide passage may be shaped to correspond to a cross section of the strap body 411. The guide member 412 may be mounted on the body 60 of the roller units 21 and 22.

When the vehicle door 5 is opened and closed in the swing mode, the projection 421 of the cam member 420 may be received in any one of the recesses 413, 414, 415, and 416 of the strap body 411, and thus the strap body 411 may be held and stopped at regular intervals.

FIGS. 17 to 28 illustrate the vehicle door check mechanism 110, 210, 310, or 410 applied to the roller units 21 and 22 of FIG. 9, but the vehicle door check mechanism 110, 210, 310, or 410 may also be applied to the roller units 21 and 22 of FIG. 6. In addition, the vehicle door check mechanism 110, 210, 310, or 410 according to the exemplary embodiments of the present disclosure may be applied to various swing-type vehicle doors, in addition to the vehicle door opening and closing apparatus according to exemplary embodiments of the present disclosure. For example, the strap body 111, 211, 311, or 411 of the vehicle door check mechanism 110, 210, 310, or 410 may be mounted on the vehicle door, and the first and second hold members 121 and 122 of the hold unit, the hold member 250, the strap housing 320, or the cam member 420 may be mounted on a hinge component (for example, a hinge bracket) connecting the vehicle door and the vehicle body.

FIGS. 1 to 28 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 29:
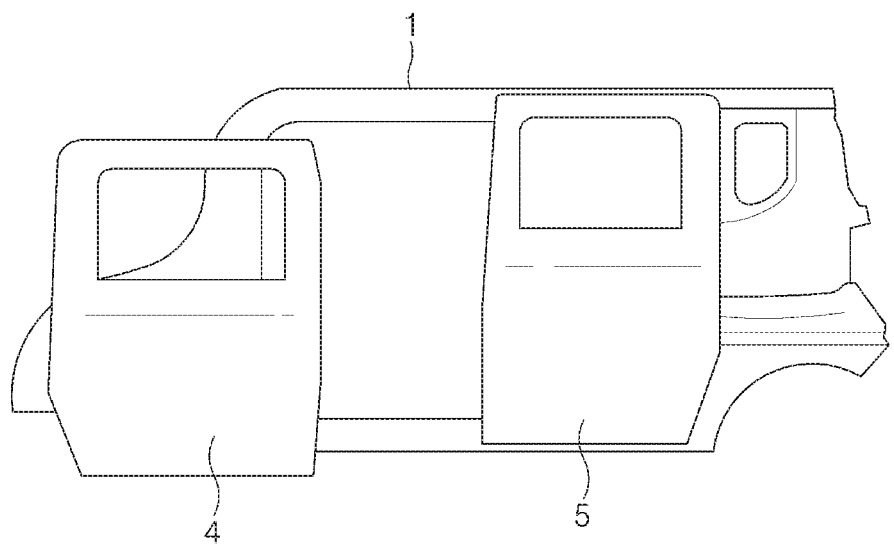
FIG. 29 illustrates a vehicle door opening and closing apparatus according to an exemplary embodiment of the present disclosure, which is applied to a front door of a vehicle, in a state in which the front door is opened in a sliding mode.
Figure 30:
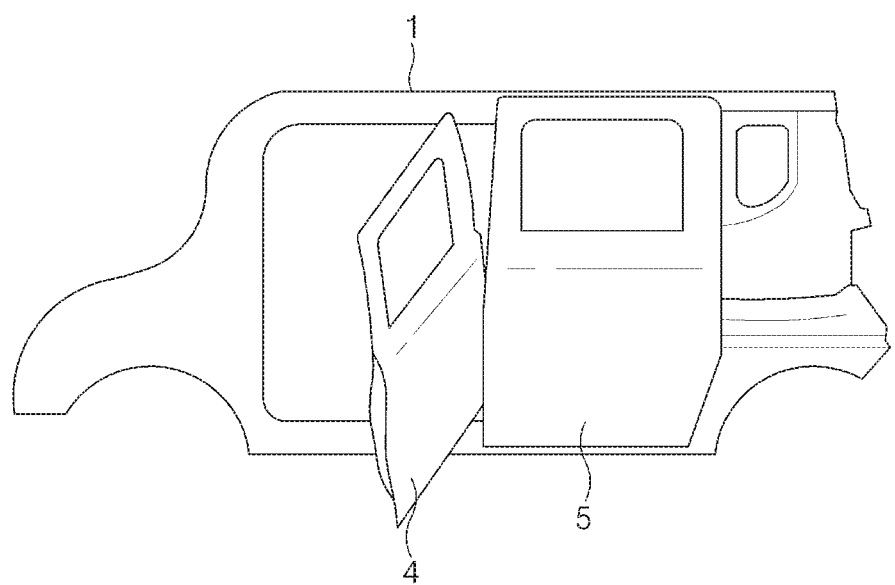
FIG. 30 illustrates a state in which the front door of FIG. 29 is opened in a swing mode.

FIGS. 29 and 30 illustrate the vehicle door opening and closing apparatus according to exemplary embodiments of the present disclosure applied to the front door 4. FIG. 29 illustrates a state in which the front door 4 is opened in the sliding mode, and FIG. 30 illustrates a state in which the front door 4 is opened in the swing mode.

Figure 31:
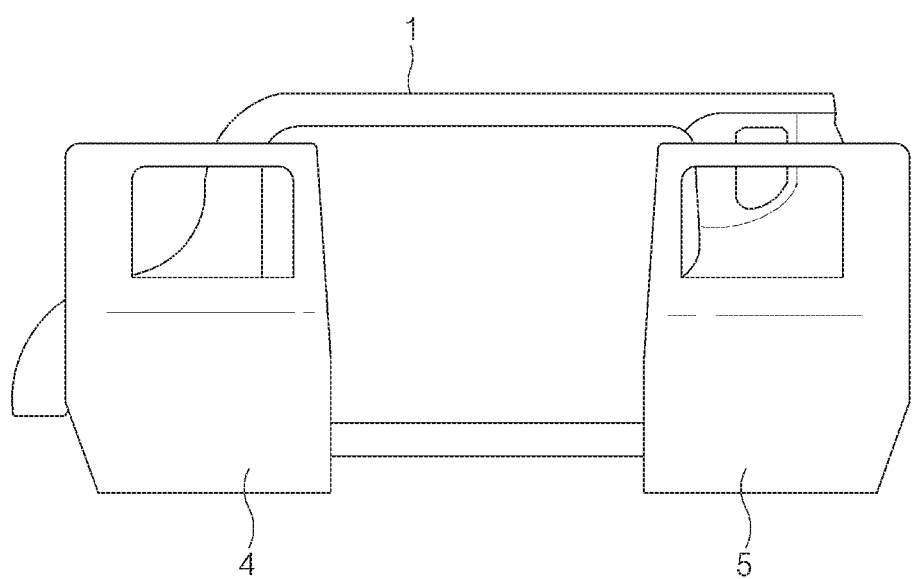
FIG. 31 illustrates a vehicle door opening and closing apparatus according to an exemplary embodiment of the present disclosure, which is applied to a front door and a rear door of a vehicle, in a state in which the front door and the rear door are opened in a sliding mode.
Figure 32:
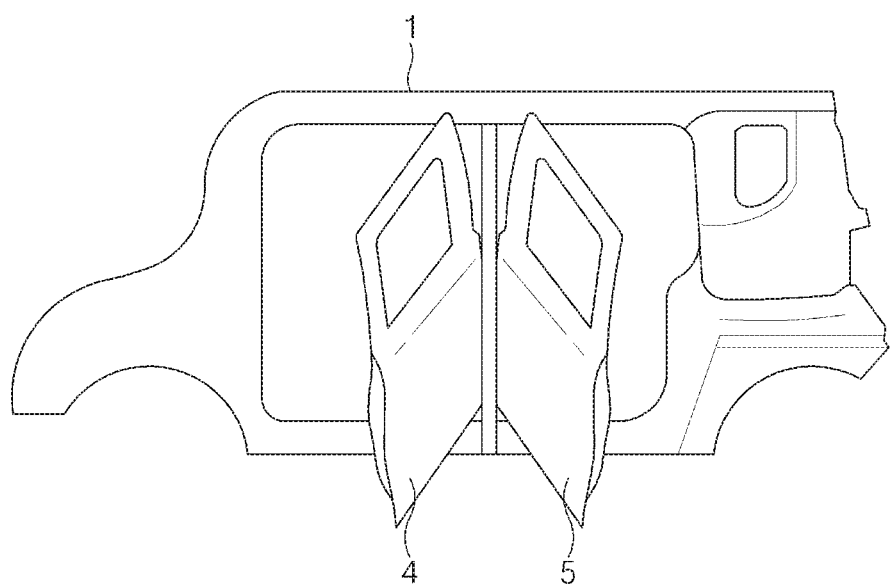
FIG. 32 illustrates a state in which the front door and the rear door of FIG. 31 are opened in a swing mode.

FIGS. 31 and 32 illustrate the vehicle door opening and closing apparatus according to exemplary embodiments of the present disclosure applied to both the front door 4 and the rear door 5. FIG. 31 illustrates a state in which the front door 4 and the rear door 5 are opened in the sliding mode, and FIG. 32 illustrates a state in which the front door 4 and the rear door 5 are opened in the swing mode.

As set forth above, the vehicle door check mechanism according to exemplary embodiments of the present disclosure may have a curved structure corresponding to the swing trajectory of the vehicle door, which makes the mounting thereof easy even when a space between the vehicle door and the vehicle body is narrow as in a pillarless vehicle, and reliably ensures a vehicle door check operation.

The vehicle door opening and closing apparatus according to exemplary embodiments of the present disclosure may perform the opening and closing operations of the vehicle door by selectively switching the sliding mode and the swing mode, thereby meeting the needs of customers such as convenience and diversity. In addition, it may select the opening and closing operations of the vehicle door by taking the customer's situation and environment into consideration, thereby improving convenience and quality.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door check mechanism comprising:
   a strap body to be mounted on a portion of a vehicle door adjacent to a rotation axis of the vehicle door,
   wherein the strap body is configured to move with the vehicle door when the vehicle door swings around the rotation axis,
   wherein the strap body is curved to have a predetermined curvature radius,
   wherein a center of the curvature radius is located on the rotation axis of the vehicle door, and
   wherein the strap body has a fixed end that is fixed to the vehicle door and a free end that is spaced apart from the vehicle door; and
   a holder configured to hold the strap body at regular intervals.

2. The vehicle door check mechanism according to claim 1, wherein:
   the holder includes a first hold member and a second hold member disposed on both sides of the strap body;
   the first hold member has a plurality of recesses spaced apart from each other in a longitudinal direction of the first hold member;
   the second hold member has a plurality of recesses spaced apart from each other in a longitudinal direction of the second hold member; and
   the strap body has a first projection configured to be selectively received in any one of the recesses of the first hold member, and a second projection configured to be selectively received in any one of the recesses of the second hold member.

3. The vehicle door check mechanism according to claim 2, wherein:
   the first hold member has a first cushion material contacting the first projection; and
   the second hold member has a second cushion material contacting the second projection.

4. The vehicle door check mechanism according to claim 1, wherein:
   the holder includes a hold member located below the strap body;
   the strap body has a roller rotatably mounted on the free end;
   the hold member has a plurality of recesses;
   the plurality of recesses are spaced apart from each other in a longitudinal direction of the hold member; and
   the roller is configured to be selectively received in any one of the recesses.

5. The vehicle door check mechanism according to claim 1, wherein:
   the strap body has a plurality of recesses facing the rotation axis of the vehicle door; and
   the holder includes a cam member having a projection configured to be selectively received in any one of the recesses of the strap body.

6. The vehicle door check mechanism according to claim 5, wherein the cam member is configured to allow the projection of the cam member to be biased toward the recesses of the strap body by a biasing element.

7. The vehicle door check mechanism according to claim 6, wherein:
   the holder further includes a guide roller configured to guide a movement of the strap body; and
   the guide roller is disposed to face the cam member.

8. The vehicle door check mechanism according to claim 1, wherein:
   the strap body has a plurality of inner peripheral recesses facing the rotation axis of the vehicle door, and a plurality of outer peripheral recesses opposing the plurality of inner peripheral recesses; and
   the holder includes a first ball configured to be selectively received in any one of the outer peripheral recesses, and a second ball configured to be selectively received in any one of the inner peripheral recesses.

9. The vehicle door check mechanism according to claim 8, further comprising a strap housing configured to guide a movement of the strap body, wherein the first ball and the second ball are mounted in the strap housing.

10. The vehicle door check mechanism according to claim 9, wherein:
    the first ball is supported by a first ball support;
    the first ball support is elastically supported by a first elastic member;
    the second ball is supported by a second ball support; and
    the second ball support is elastically supported by a second elastic member.

11. The vehicle door check mechanism according to claim 1, further comprising a guide member configured to guide a movement of the strap body.

12. A vehicle door check mechanism comprising:
    a strap body to be mounted on a portion of a vehicle door adjacent to a rotation axis of the vehicle door, the strap body configured to move with the vehicle door as the vehicle door swings around the rotation axis, wherein the strap body is curved to have a predetermined curvature radius, a center of the curvature radius being located on the rotation axis of the vehicle door; and
    a hold unit having a plurality of recesses spaced apart from each other, each recess configured to selectively receive a portion of the strap body.

13. The vehicle door check mechanism according to claim 12, wherein:
    the hold unit includes a first hold member and a second hold member disposed on opposite sides of the strap body;
    the first hold member has ones of the recesses spaced apart from each other in a longitudinal direction of the first hold member;
    the second hold member has ones of the recesses spaced apart from each other in a longitudinal direction of the second hold member; and the strap body has a first projection configured to be selectively received in any one of the recesses of the first hold member and a second projection configured to be selectively received in any one of the recesses of the second hold member.

14. The vehicle door check mechanism according to claim 12 wherein:
the hold unit includes a hold member located below the strap body;
the strap body has a roller rotatably mounted on a free end;
the plurality of recesses are spaced apart from each other in a longitudinal direction of the hold member; and
the roller is configured to be selectively received in any one of the recesses.

15. A vehicle comprising:
a vehicle body;
a vehicle door;
a rail mounted on the vehicle body;
a roller unit mounted on the vehicle door, and configured to allow the vehicle door to open and close in one mode selected from a sliding mode and a swing mode, wherein in the sliding mode the vehicle door is configured to slide along the rail, and in the swing mode the vehicle door is configured to swing in a predetermined position of the rail; and
a vehicle door check mechanism disposed between the vehicle door and the roller unit, wherein the vehicle door check mechanism comprises:
a strap body mounted on a portion of the vehicle door adjacent to a rotation axis of the vehicle door, the strap body configured to move with the vehicle door as the vehicle door swings around the rotation axis, wherein the strap body is curved to have a predetermined curvature radius; and
a hold unit configured to allow the strap body to be held at regular intervals.

16. The vehicle according to claim 15, wherein:
the roller unit includes a hold lock;
the roller unit is releasably held in the predetermined position of the rail by the hold lock;
the vehicle door is configured to swing around the rotation axis when the roller unit is held in the predetermined position of the rail by the hold lock; and
the vehicle door is configured to slide along the rail when the roller unit is released by the hold lock.

17. The vehicle according to claim 16, wherein:
the roller unit includes a roller bracket having a roller configured to roll along the rail, and a body connecting the roller bracket and the vehicle door; and
the hold unit is mounted on the body of the roller unit.

18. The vehicle according to claim 15, wherein:
a center of the curvature radius is located on the rotation axis of the vehicle door;
the strap body has a fixed end which is fixed to the vehicle door, and a free end which is spaced apart from the vehicle door;
the hold unit includes a first hold member and a second hold member disposed on both sides of the strap body;
the first hold member has multiple recesses spaced apart from each other in a longitudinal direction of the first hold member;
the second hold member has multiple recesses spaced apart from each other in a longitudinal direction of the second hold member;
the strap body has a first projection configured to be selectively received in any one of the multiple recesses of the first hold member, and a second projection configured to be selectively received in any one of the multiple recesses of the second hold member;
the first hold member has a first cushion material contacting the first projection; and
the second hold member has a second cushion material contacting the second projection.

19. The vehicle according to claim 15, wherein:
a center of the curvature radius is located on the rotation axis of the vehicle door;
the strap body has a fixed end which is fixed to the vehicle door, and a free end which is spaced apart from the vehicle door;
the hold unit includes a hold member located below the strap body;
the strap body has a roller rotatably mounted on the free end;
the hold member has multiple recesses;
the multiple recesses are spaced apart from each other in a longitudinal direction of the hold member; and
the roller is configured to be selectively received in any one of the multiple recesses.

* * * * *